United States Patent
Nara et al.

(10) Patent No.: US 7,359,084 B2
(45) Date of Patent: Apr. 15, 2008

(54) PREVIEW DISPLAY FOR MULTIPLE-SIDED PRINTING

(75) Inventors: Shigeo Nara, Kanagawa (JP); Takuya Miyazato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 893 days.

(21) Appl. No.: 10/359,264

(22) Filed: Feb. 6, 2003

(65) Prior Publication Data

US 2003/0184806 A1   Oct. 2, 2003

(30) Foreign Application Priority Data

Feb. 6, 2002   (JP)   ............................. 2002-029582

(51) Int. Cl.
*G06K 15/00* (2006.01)

(52) U.S. Cl. .................. 358/1.18; 358/1.15; 358/537; 399/391; 715/517; 715/522; 715/525; 715/526; 715/527

(58) Field of Classification Search ............... 358/1.15, 358/1.18, 451, 1.13, 537; 399/391, 364; 715/517, 522, 525, 526, 527
See application file for complete search history.

(56) References Cited

U.S. PATENT DOCUMENTS

| | | | |
|---|---|---|---|
| 5,124,731 A * | 6/1992 | Knodt et al. ................ | 347/129 |
| 5,615,015 A * | 3/1997 | Krist et al. ................ | 358/296 |
| 5,760,775 A * | 6/1998 | Sklut et al. ................ | 715/839 |
| 5,764,811 A * | 6/1998 | Kakutani .................... | 382/252 |
| 5,905,935 A * | 5/1999 | Wakamatsu et al. ........ | 399/407 |
| 5,995,721 A * | 11/1999 | Rourke et al. ............. | 358/1.15 |
| 6,134,568 A * | 10/2000 | Tonkin ....................... | 715/526 |
| 6,259,468 B1 * | 7/2001 | Higuchi ..................... | 347/262 |
| 6,301,013 B1 * | 10/2001 | Momose et al. ........... | 358/1.15 |
| 6,401,141 B1 * | 6/2002 | Kumler ...................... | 710/10 |
| 6,452,607 B1 * | 9/2002 | Livingston ................. | 715/705 |
| 6,549,299 B1 * | 4/2003 | Allen et al. ................ | 358/1.18 |
| 6,574,002 B1 * | 6/2003 | Paczewitz .................. | 358/1.13 |
| 6,762,856 B2 * | 7/2004 | Farrell et al. ............... | 358/1.8 |
| 6,842,262 B1 * | 1/2005 | Gillihan et al. ............ | 358/1.15 |
| 6,930,796 B1 * | 8/2005 | Matsuura et al. ........... | 358/1.2 |
| 7,009,728 B1 * | 3/2006 | Hara et al. ................. | 358/1.16 |
| 7,206,087 B2 * | 4/2007 | Ryan et al. ................ | 358/1.15 |
| 7,277,192 B2 * | 10/2007 | Kotani et al. .............. | 358/1.13 |
| 2003/0051625 A1 * | 3/2003 | Miyazato .................... | 101/484 |

\* cited by examiner

*Primary Examiner*—King Y. Poon
*Assistant Examiner*—Richard Z Zhu
(74) *Attorney, Agent, or Firm*—Fitzpatrick, Cella, Harper & Scinto

(57) ABSTRACT

Displaying of document information to be printed in a printing apparatus capable of inserting, during printing on print sheets fed from a predetermined sheet feed unit, a plurality of types of sheets from sheet feed units different from the predetermined sheet feed unit, is controlled by setting information on an insert sheet to be inserted in document information, determining for each page of the document information and of the set insert sheet whether or not the page is printable or unprintable, and controlling to differently display a printable page and an unprintable page in accordance with the determination result.

2 Claims, 37 Drawing Sheets

FIG. 4A

| NO | ATTRIBUTE INFORMATION | | REMARKS |
|---|---|---|---|
| 1 | PRINTING METHOD | SINGLE-SIDED / DOUBLE-SIDED / BOOKBINDING PRINTING | |
| 2 | PAPER SIZE | ORIGINAL SIZE / FIXED SIZE | • Z-FOLD IS DESIGNATED WHEN "A4 + A3", "B4 + B3", OR "LETTER + LEDGER (11 × 17)" IS DESIGNATED<br>• ORIGINAL SIZE OF FIRST CHAPTER / PAGE IS AUTOMATICALLY SELECTED WHEN BOOKBINDING PRINTING OR N-up PRINTING IS DESIGNATED |
| 3 | PAPER DIRECTION | PORTRAIT / LANDSCAPE | • SELECTABLE ONLY FOR FIXED SIZE |
| 4 | BINDING MARGIN / BINDING DIRECTION | | • SHIFT / ENLARGEMENT & REDUCTION CAN BE DESIGNATED |
| 5 | N-up PRINTING | NUMBER OF PAGES / LAYOUT ORDER / BOUNDARY / LAYOUT POSITION, etc. | • LAYOUT POSITION : NINE PATTERNS<br>• X1 PRINTING CAN BE DESIGNATED |
| 6 | ENLARGEMENT / REDUCTION | ON / OFF | ON IS AUTOMATICALLY DESIGNATED WHEN PAPER SIZE IS FIXED SIZE OR N-up PRINTING IS SELECTED. CAN BE SET TO OFF. |
| 7 | WATERMARK | | • WATERMARK CAN BE DESIGNATED INDIVIDUALLY IN LOGICAL OR PHYSICAL PAGES<br>• ALL CHAPTERS / PAGES ARE TARGETED |

FIG. 4B

| | | |
|---|---|---|
| 8 | HEADER/FOOTER | • HEADER/FOOTER CAN BE DESIGNATED INDIVIDUALLY IN LOGICAL OR PHYSICAL PAGES<br>• ALL CHAPTERS/PAGES ARE TARGETED |
| 9 | DISCHARGE METHOD STAPLE/PUNCH HOLE | • STAPLING/PUNCHING ONLY IN SINGLE-/DOUBLE-SIDED PRINTING<br>• STAPLING AT ONE/TWO POSITIONS |
| 10 | DETAILS OF BOOKBINDING<br>OPENING DIRECTION/SADDLE STITCH/ENLARGEMENT & REDUCTION DESIGNATION/BINDING MARGIN/FASCICLE DESIGNATION, etc. | • ONLY IN BOOKBINDING PRINTING |
| 11 | FRONT/BACK COVER | • PRINTING IS DESIGNATED FOR 1/2 FRONT COVER OR 1/2 BACK COVER<br>• FEED PORT (INCLUDING INSERTER) IS DESIGNATED |
| 12 | INDEX SHEET | • PRINTING OF CHARACTER STRING ON INDEX PORTION OR ANNOTATION ON INDEX SHEET CAN BE SET<br>• BOOKBINDING CANNOT BE DESIGNATED |
| 13 | SLIP SHEET | • FEED PORT (INCLUDING INSERTER) IS DESIGNATED<br>• ORIGINAL DATA CAN BE PRINTED ON INSERTED PAPER<br>• BOOKBINDING CANNOT BE DESIGNATED |
| 14 | CHAPTERING<br>"NONE"/"PAGE BREAK"/"PAPER CHANGE" | • "PAPER CHANGE" IS FIXED WHEN INDEX SHEET OR SLIP SHEET IS DESIGNATED<br>• "PAPER CHANGE" IN SINGLE-SIDED PRINTING |

FIG. 5

| NO | ATTRIBUTE INFORMATION | | REMARKS |
|---|---|---|---|
| 1 | PAPER SIZE | ORIGINAL SIZE / FIXED SIZE | • "PAPER CHANGE" IS AUTOMATICALLY DESIGNATED WHEN FIXED SIZE IS SELECTED<br>• WHEN A PLURALITY OF PAPER SHEETS ARE SELECTED BY BOOK, PAPER SIZE CAN BE CHANGED TO ONLY DESIGNATED PAPER. PAPER SIZE CAN BE CHANGED EVEN WITH DESIGNATION COMPLYING WITH BOOK |
| 2 | PAPER DIRECTION | PORTRAIT / LANDSCAPE | • SELECTABLE ONLY FOR FIXED SIZE |
| 3 | N-up PRINTING | NUMBER OF PAGES / LAYOUT ORDER / BOUNDARY / LAYOUT POSITION, etc. | • LAYOUT POSITION : NINE PATTERNS<br>• X1 PRINTING CAN BE DESIGNATED |
| 4 | ENLARGEMENT / REDUCTION | ON / OFF | • ON IS AUTOMATICALLY DESIGNATED WHEN PAPER SIZE IS FIXED SIZE OR N-up PRINTING IS SELECTED. CAN BE SET TO OFF. |
| 5 | WATERMARK | DISPLAY / NON-DISPLAY | • WHETHER TO DISPLAY ALL WATERMARKS DESIGNATED BY BOOK IS DESIGNATED |
| 6 | HEADER / FOOTER | DISPLAY / NON-DISPLAY | • WHETHER TO DISPLAY ALL HEADERS / FOOTERS DESIGNATED BY BOOK IS DESIGNATED |
| 7 | DISCHARGE METHOD | STAPLE | • STAPLE CAN BE SET OFF WHEN STAPLE IS DESIGNATED BY BOOK. DEFAULT VALUE IS "ON" |

FIG. 6

| NO | ATTRIBUTE INFORMATION | | REMARKS |
|---|---|---|---|
| 1 | PAGE ROTATION DESIGNATION | | · 0° / 90° / 180° / 270° CAN BE DESIGNATED |
| 2 | WATERMARK | DISPLAY / NON-DISPLAY | · WHETHER TO DISPLAY ALL WATERMARKS DESIGNATED BY BOOK IS DESIGNATED |
| 3 | HEADER / FOOTER | DISPLAY / NON-DISPLAY | · WHETHER TO DISPLAY ALL HEADERS / FOOTERS DESIGNATED BY BOOK IS DESIGNATED |
| 4 | ZOOM | 50% - 200% | · ZOOM RATIO RELATIVE TO SIZE WHICH IS FIT IN VIRTUAL LOGICAL PAGE REGION AND SET AS 100% IS DESIGNATED |
| 5 | LAYOUT POSITION | | · NINE FIXED PATTERNS AND ARBITRARY POSITION CAN BE DESIGNATED |
| 6 | ANNOTATION | | |
| 7 | VARIABLE ITEM | | |
| 8 | PAGE DIVISION | | |

FIG. 20

Settings of Decoration

Pattern: [Front Cover + Index Sheet + Slip Sheet ▼]

Front Cover: ⦿ Add Front Cover Using Inserter
○ Designate Paper Sheet at Front Page and Print
Sheet Feed Unit: [Upper Cassette ▼]

Type Number of Index Sheet: [5-Tab ▼]
☐ Print Character String on Index Portion
[Details of Index Sheet...]

Slip Sheet: ○ Insert Slip Sheet for Each Chapter by Using Inserter
⦿ Insert Slip Sheet for Each Chapter by Designating Sheet Feed Unit
Sheet Feed Unit: [Upper Cassette ▼]
☐ Print on Slip Sheet Back Cover: ○ Add Back Cover for Bookbinding Printing by Using Inserter
⦿ Print Last Page by Designating Another Print Sheet
Sheet Feed Unit: [Upper Cassette ▼]

[OK] [Cancel] [Help]

FIG. 23

Settings of Decoration

Pattern: [Front Cover + Slip Sheet + Back Cover ▼]

Front Cover: ● Add Front Cover Using Inserter
○ Designate Paper Sheet at Front Page and Print
Sheet Feed Unit: [Upper Cassette ▼]

Type Number of Index Sheet: [5-Tab ▼]
☐ Print Character String on Index Portion
[Details of Index Sheet...]

Slip Sheet: ○ Insert Slip Sheet for Each Chapter by Using Inserter
● Insert Slip Sheet for Each Chapter by Designating Sheet Feed Unit
Sheet Feed Unit: [Upper Cassette ▼]
☐ Print on Slip Sheet Back Cover: ○ Add Back Cover for Bookbinding Printing by Using Inserter
● Print Last Page by Designating Another Print Sheet
Sheet Feed Unit: [Upper Cassette ▼]

[ OK ]  [ Cancel ]  [ Help ]

FIG. 25

Settings of Decoration

Pattern: None

Front Cover: ○ Add Front Cover Using Inserter
● Designate Paper Sheet at Front Page and Print
Sheet Feed Unit: Upper Cassette Type Number of Index Sheet: 5-Tab
☐ Print Character String on Index Portion
Details of Index Sheet...

Slip Sheet: ○ Insert Slip Sheet for Each Chapter by Using Inserter
● Insert Slip Sheet for Each Chapter by Designating Sheet Feed Unit
Sheet Feed Unit: Upper Cassette
☐ Print on Slip Sheet Back Cover: ○ Add Back Cover for Bookbinding Printing by Using Inserter
● Print Last Page by Designating Another Print Sheet
Sheet Feed Unit: Upper Cassette OK    Cancel    Help

FIG. 26

Settings of Decoration

Pattern: [Front Cover ▼]

Front Cover: ○ Add Front Cover Using Inserter
● Designate Paper Sheet at Front Page and Print
Sheet Feed Unit: [Upper Cassette ▼]

Type Number of Index Sheet: [5-Tab ▼]
☐ Print Character String on Index Portion
[Details of Index Sheet...]

Slip Sheet: ○ Insert Slip Sheet for Each Chapter by Using Inserter
● Insert Slip Sheet for Each Chapter by Designating Sheet Feed Unit
Sheet Feed Unit: [Upper Cassette ▼]
☐ Print on Slip Sheet Back Cover: ○ Add Back Cover for Bookbinding Printing by Using Inserter
● Print Last Page by Designating Another Print Sheet
Sheet Feed Unit: [Upper Cassette ▼]

[OK]  [Cancel]  [Help]

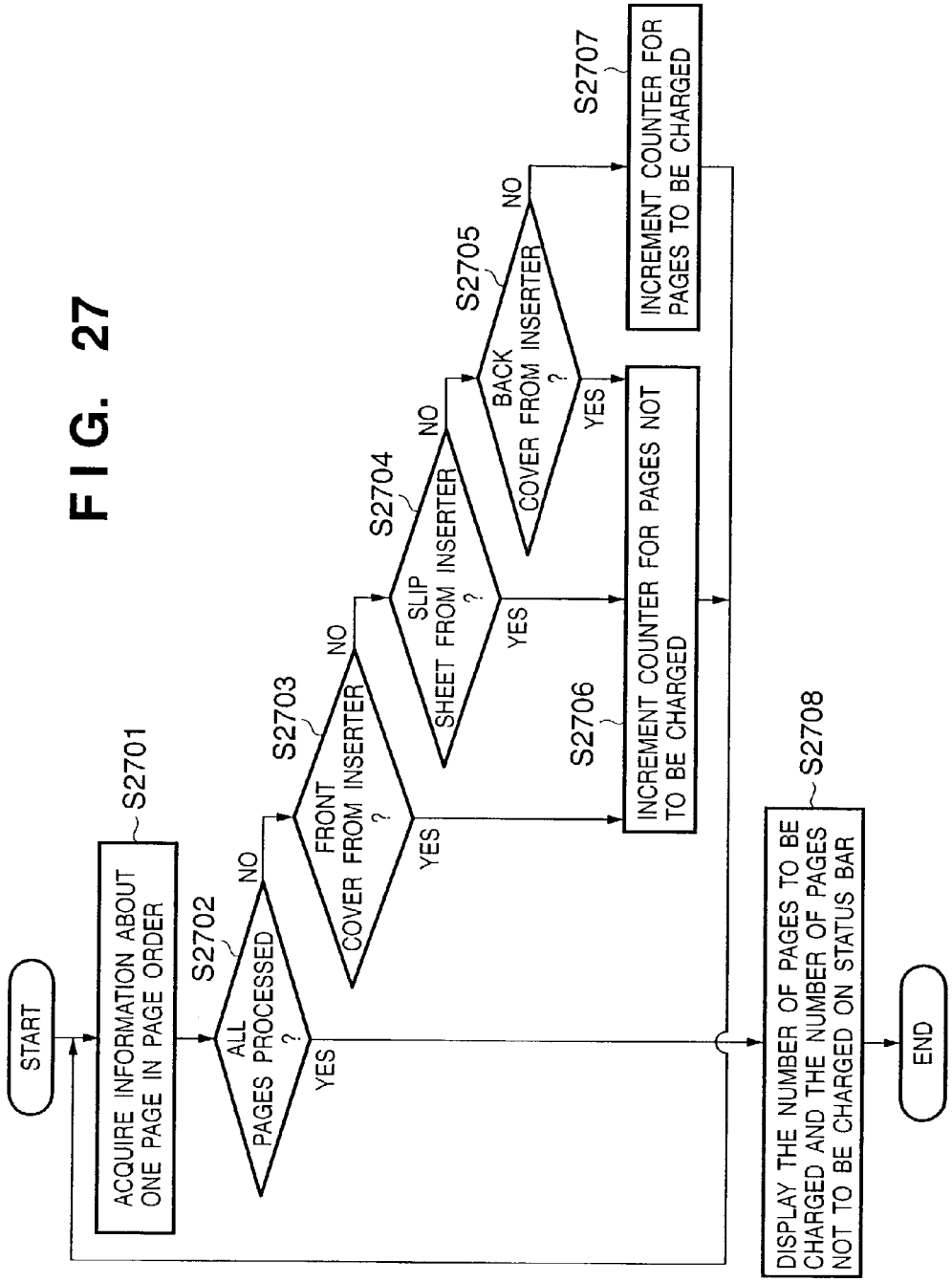

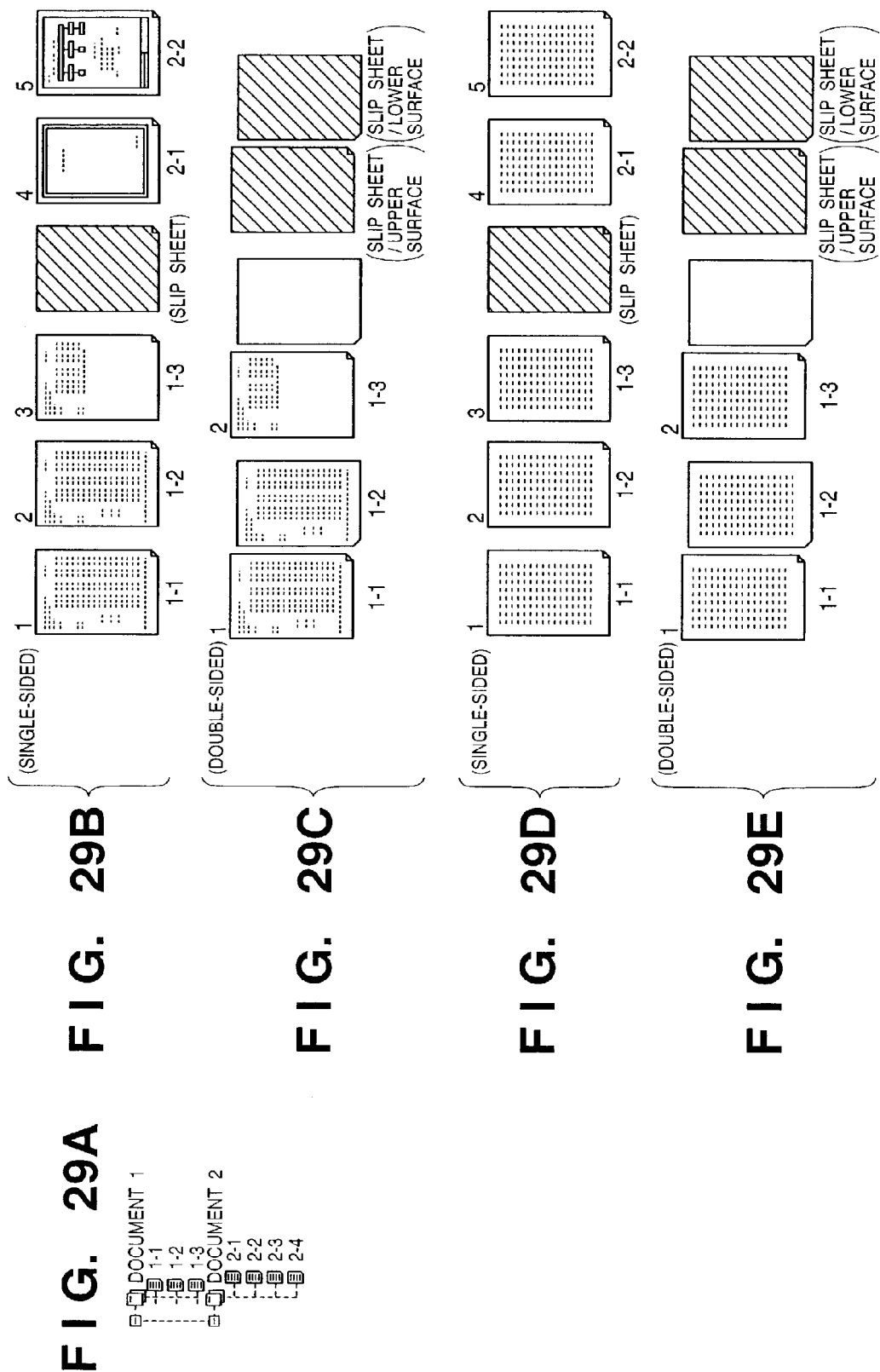

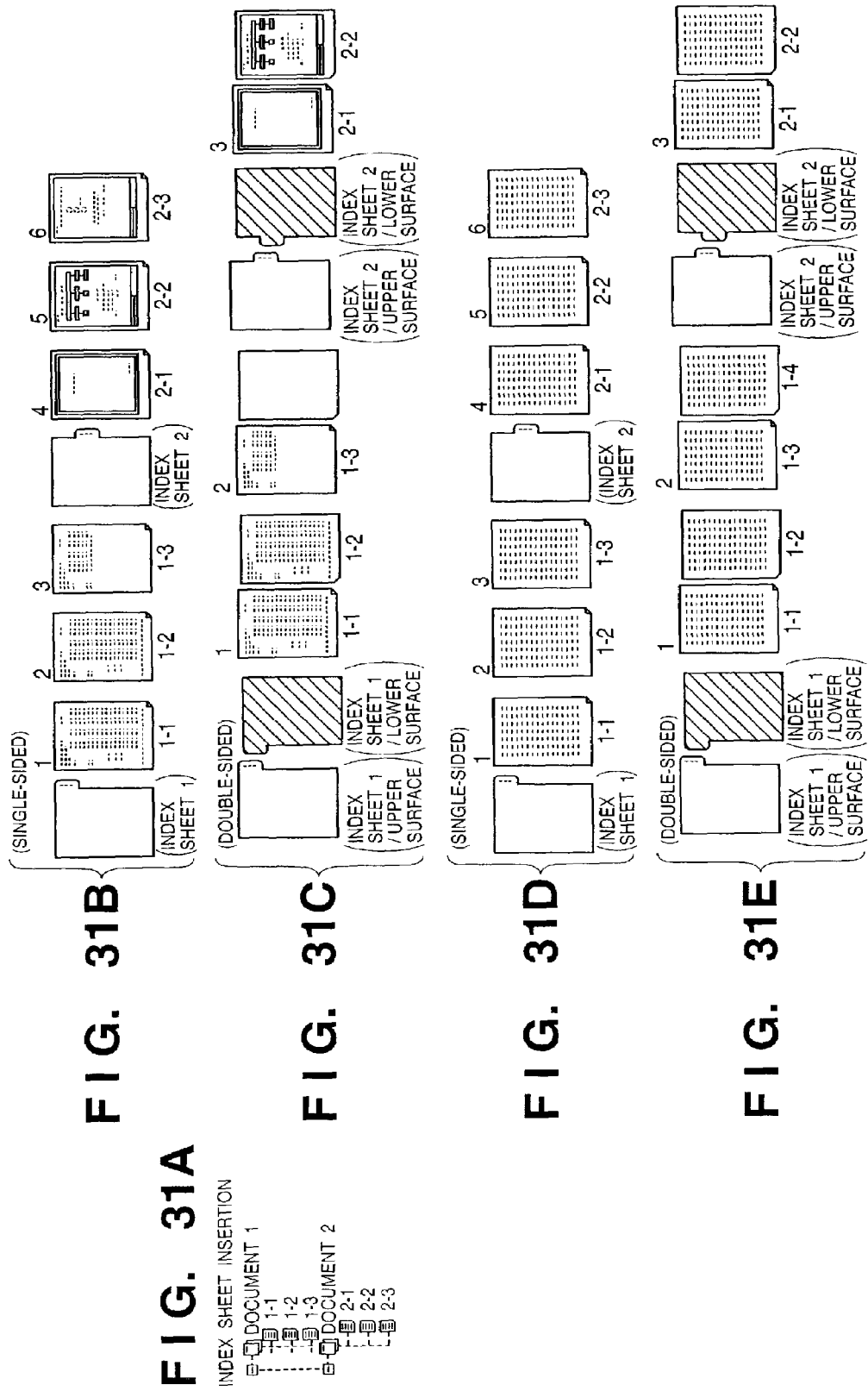

PREVIEW DISPLAY FOR MULTIPLE-SIDED PRINTING

FIELD OF THE INVENTION

The present invention relates to an information processing method, information processing apparatus and printing apparatus, for example, to an information processing method, information processing apparatus and printing apparatus in a case wherein a print layout in a print layout application or printer driver is displayed.

BACKGROUND OF THE INVENTION

Different types of data such as characters, tables, and images require different structures which define the data and different editing operations for the data. Various application programs are provided in accordance with the type of data. The user uses different applications for different types of data: a character processing program in order to edit characters, a spreadsheet program in order to edit tables, and an image editing program in order to edit images.

In this way, the user generally uses different application programs for different types of data. In general, a document to be created by the user is made up of a plurality of types of data such as characters and tables, or characters and images, rather than a document formed from only one type of data such as characters, tables, or images. To create a target document containing a plurality of types of data, the user must use the printing functions of various applications to print data by the respective applications, and combine the print materials in a desired order.

Some programs such as so-called "Office Suite" which forms one integrated application from various applications provide a function of combining data generated by respective applications into one document. The use of the integrated application allows the user to combine data created by respective applications into one target document by using a specific application included in the integrated application.

Some printer drivers have a function for inserting special-purpose paper (referred to as "paper sheet insertion function") in a print job.

A printer driver with a paper sheet insertion function can designate to insert front and back covers which are respectively inserted in first and last pages, in which a paper sheet fed by using an inserter mounted on the device is inserted in the first and/or last page of a document. In the state of the art, however, the device supports only the front and back covers as insertion paper sheets to be designated, and a slip sheet which is inserted as a break for each group of pages (to be referred to as a chapter, hereinafter), an index sheet which is inserted as an index for each chapter, and the like have not been supported yet. In addition, the insertion paper is fed only from the inserter of the device, and feed cassettes mounted on the device cannot be selectively used. Some applications or printer drivers have a print preview function which previews, before printing, how a document is to be printed, and enables a user to recognize it. However, since the print preview function of the application previews document information, no information about the insertion paper is displayed. The print preview function of some printer drivers previews that the insertion paper sheet is present, but it is difficult to make the user determine which of paper sheets on the print preview window is the insertion paper sheet.

The use of an integrated application for creating a target document enables arranging various data in the data state without printing them out. No heavy labor is required in comparison with creation of a target document by combining print materials. However, applications for editing and creating various data are restricted to ones included in the integrated application, so a user-desired application is not always exploited. A target document created by the integrated application is one document file, and management such as editing and output is done for each file. The application function poses many constraints on setting the format of part of the document file. For example, the user must change format settings at each portion where the format is changed, and print a target page again. This leads to much labor and low productivity, similar to the above-mentioned method.

In a conventional system for displaying a print layout on a display, even when a specialty paper sheet is to be inserted and the inserted specialty paper sheet is not to be printed, since printable pages and unprintable pages are displayed in the same form, a user cannot determine on the window display which of paper sheets are unprintable. For this reason, when, e.g., a page number or the like is to be additionally drawn from the print layout display window, the presence of the unprintable insertion paper causes a trouble.

SUMMARY OF THE INVENTION

The present invention has been made in consideration of the above situation, and has as its object to provide a mechanism with good operability for a user when a paper sheet is inserted in a document to be printed.

It is another object of the present invention to distinguishably show a printable page and a non-printable page as well as make the size of the non-printable page perceptible upon displaying a print layout.

According to the present invention, the foregoing objects are attained by providing an information processing method of controlling a display of document information to be printed in a printing apparatus capable of inserting, during printing on print sheets fed from a predetermined sheet feed unit, a plurality of types of sheets from sheet feed units different from the predetermined sheet feed unit, comprising: setting information on an insert sheet to be inserted in document information; determining for each page of the document information and of the set insert sheet whether or not the page is printable or unprintable; and controlling to differently display a printable page and an unprintable page in accordance with the determination result.

According to the present invention, the foregoing objects are attained by providing an information processing apparatus for controlling a display of document information to be printed in a printing apparatus capable of inserting, during printing on print sheets fed from a predetermined sheet feed unit, a plurality of types of sheets from sheet feed units different from the predetermined sheet feed unit, comprising: a setting unit adapted to set information on an insert sheet to be inserted in document information; a determination unit adapted to determine for each page of the document information and of the insert sheet set by the setting unit whether or not the page is printable or unprintable; and a display controller adapted to control to differently display a printable page and an unprintable page in accordance with a determination result by the determination unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIGS. 4A and 4B show a table of a list of book attributes;

FIG. 5 is a table showing a list of chapter attributes;

FIG. 6 is a table showing a list of page attributes;

FIG. 20 is a view showing a setting window when the "front cover", "index sheet/sheets", and "slip sheet/sheets" are inserted in single-sided printing and double-sided printing in the embodiment of the present invention;

FIG. 23 is a view showing a setting window when the "front cover", "slip sheet/sheets", and "back cover" are inserted in single-sided printing and double-sided printing in the embodiment of the present invention;

FIG. 25 is a view showing a setting window when none is inserted in bookbinding printing in the embodiment of the present invention;

FIG. 26 is a view showing a setting window when only the "front cover" is inserted in bookbinding printing in the embodiment of the present invention;

FIG. 27 is a flow chart showing processing of displaying on a status bar the number of pages to be charged and the number of pages not to be charged in the embodiment of the present invention;

FIGS. 29A to 29E are views showing display examples when a slip sheet fed from an inserter is inserted in a document in a print job;

FIGS. 31A to 31E are views showing display examples when index sheets are inserted in a document in a print job;

DETAILED DESCRIPTION OF THE PREFERRED EMBODIMENT

A preferred embodiment of the present invention will be described in detail in accordance with the accompanying drawings.

<General Description of System>

A document processing system as a preferred embodiment of an information processing system according to the present invention will be generally described with reference to FIGS. 1 to 12. This document processing system converts a data file created by a general application into an electronic original file by an electronic original writer. A bookbinding application provides a function of editing the electronic original file. Details of the system will be explained below.

<System Configuration and Operation>

Figure 1:
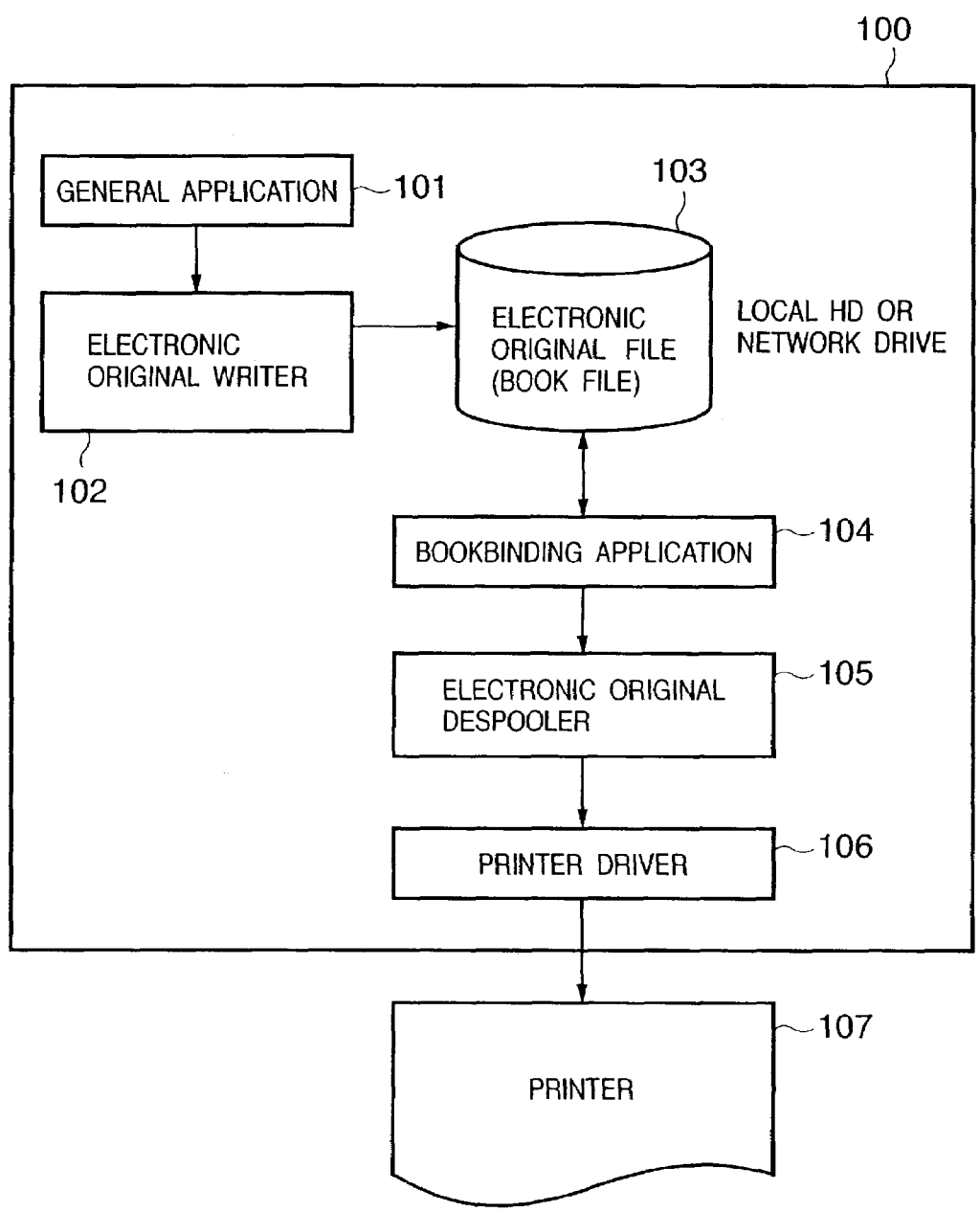
FIG. 1 is a block diagram showing a stand-alone document processing system.

FIG. 1 is a block diagram showing the software structure of the document processing system according to the embodiment. The document processing system is implemented by a digital computer 100 (to be also referred to as a host computer hereinafter) as an embodiment suited to the information processing apparatus of the present invention. A general application 101 is an application program which provides functions such as word processing, spreadsheet, photo-retouch, draw, paint, presentation, and text editing. The general application 101 has a printing function corresponding to the OS (Operating System). Such applications utilize a predetermined interface (generally called GDI) provided by the OS in printing application data such as created document data or image data. To print created data, the general application 101 transmits an output command (called a GDI function) which is determined in advance for the output module of the OS providing the interface and has an OS-dependent format. The output module which has received the output command converts the command into a format processible by an output device such as a printer, and outputs the converted command (called a DDI function). Since the format processible by the output device changes depending on the type of device, the manufacturer, and the model, a device driver is provided for each device. The OS converts a command by using the device driver, generates print data, and combines print data by JL (Job Language) to generate a print job. When the OS is Microsoft Windows, the output module is a GDI (Graphic Device Interface) module.

An electronic original writer 102 is an improvement of the device driver, and is a software module provided to implement the document processing system. The electronic original writer 102 does not target a specific output device, and converts an output command into a format processible by a bookbinding application 104 or printer driver 106 (to be described later). The format (to be referred to as an electronic original format hereinafter) converted by the electronic original writer 102 is not particularly limited as far as each original page can be expressed by a detailed format. Of substantial standard formats, for example, the PDF format by Adobe Systems and the SGML format can be adopted as electronic original formats. When the application 101 utilizes the electronic original writer 102, the electronic original writer 102 is designated as a device driver used for output, and then caused to execute printing. An electronic original file created by the electronic original writer 102 does not have a complete electronic original file format. For this reason, the electronic original writer 102 is designated as a device driver by the bookbinding application 104, and executes conversion of application data into an electronic original file under the management of the bookbinding application 104. The bookbinding application 104 completes a new incomplete electronic original file generated by the electronic original writer 102 as an electronic original file having the following format. In case of necessity to definitely discriminate these files, a file created by the electronic original writer 102 will be called an electronic original file, and an electronic original file given a structure by the bookbinding application 104 will be called a book file. If these files need not be particularly discriminated, a document file, an electronic original file, and a book file generated by applications are called document files (or document data).

As described above, the electronic original writer 102 is designated as a device driver, and the general application 101 prints the data. Application data is converted into an electronic original format in pages (to be referred to as logical pages or original pages hereinafter) defined by the application 101. The converted data is stored as an electronic original file 103 in a storage medium such as a hard disk. The hard disk may be the local drive of the computer which implements the document processing system of this embodiment, or when the computer is connected to a network, may be a drive provided on the network.

The bookbinding application 104 provides the user with a function of loading and editing the electronic original file or book file 103. The bookbinding application 104 provides no function of editing the contents of each page, but a function of editing a chapter or book structure (to be described later) made up of pages as a minimum unit.

To print the book file 103 edited by the bookbinding application 104, the bookbinding application 104 activates an electronic original despooler 105. The electronic original despooler 105 reads out a designated book file from the hard disk. To print each page in a format described in the book file, the electronic original despooler 105 generates an output command complying with the output module of the OS described above, and outputs the command to the output module (not shown). At this time, the printer driver 106 of a printer 107 used as an output device is designated as a device driver. The output module converts the output command received using the printer driver 106 of the designated printer 107 into a device command interpretable by the printer 107. The device command is transmitted to the printer 107, which prints an image corresponding to the command.

Figure 2:
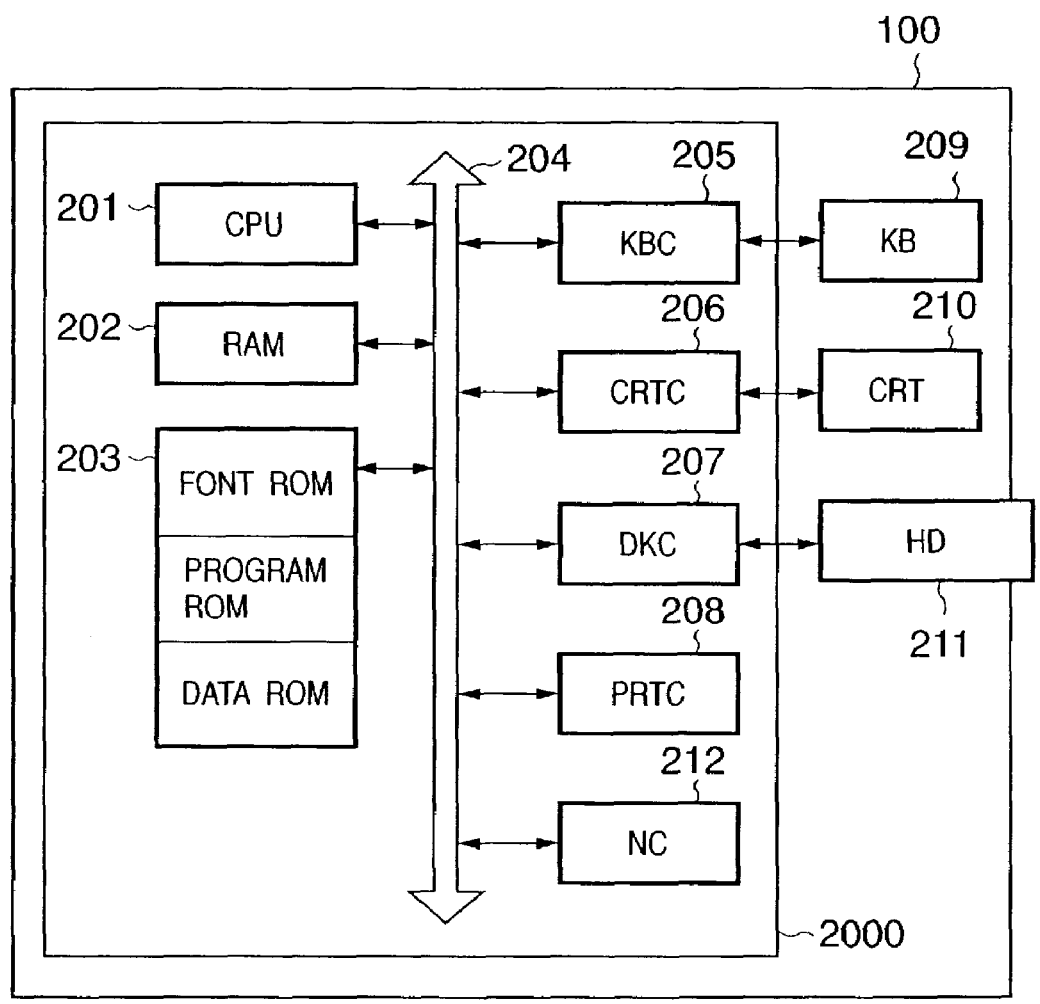
FIG. 2 is a block diagram showing a computer which implements the document processing system.

FIG. 2 is a block diagram showing the hardware of the computer 100. In FIG. 2, a CPU 201 executes a program such as an OS, general application, or bookbinding application which is stored in the program ROM of a ROM 203 or loaded from a hard disk 211 to a RAM 202, and realizes the software structure in FIG. 1 or flow chart procedures (to be described later). The RAM 202 functions as the main memory and/or work area of the CPU 201. A keyboard controller (KBC) 205 controls a key input from a keyboard 209 or a pointing device (not shown). A CRT controller (CRTC) 206 controls the display on a CRT display 210. A disk controller (DKC) 207 controls access to the hard disk (HD) 211 or floppy disk (FD: not shown) which stores a boot program, various applications, font data, user files, editing files (to be described later), and the like. A printer controller (PRTC) 208 controls signal exchange with the connected printer 107 (see FIG. 1). A network controller (NC) 212 is connected to a network, and executes communication control processing with another device connected to the network.

<Electronic Original Data Format>

Before the bookbinding application 104 is described in detail, the book file data format will be explained. The book file has a three-layered structure similar to a paper-medium book. The upper layer is called a "book", resembles one book, and defines the attributes of the entire book. The intermediate layer corresponds to a chapter in the book, and is also called a "chapter". As for each chapter, its attributes can be defined independently. The lower layer is a "page", and corresponds to each page defined by an application program. As for each page, its attributes can be defined independently. One book may include a plurality of chapters, and one chapter may include a plurality of pages.

Figure 3A:
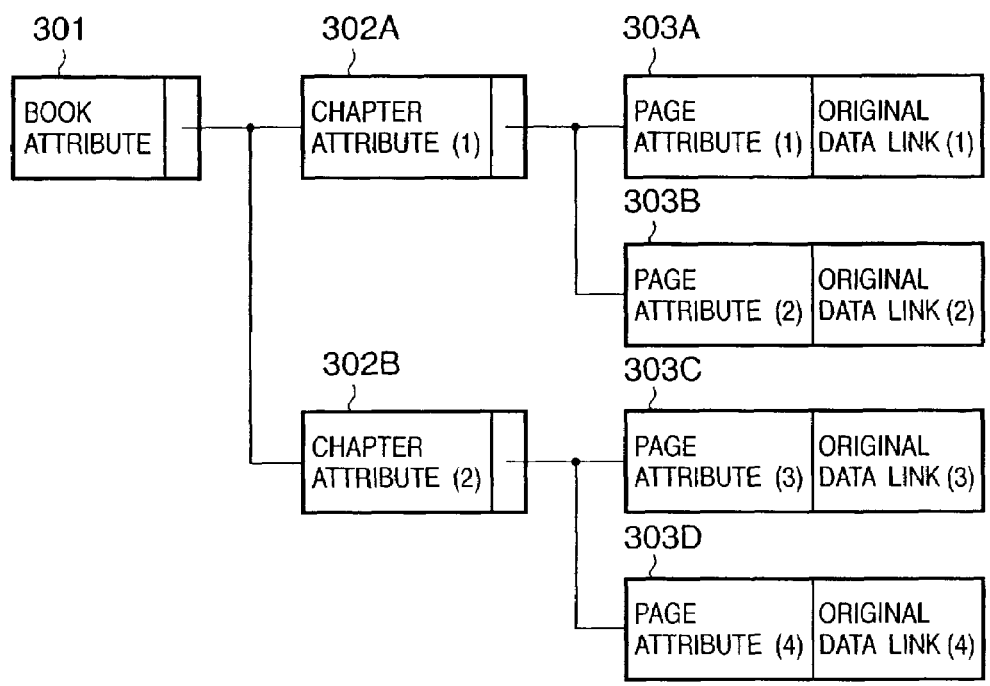
FIGS. 3A and 3B are views showing an example of a book file structure.

FIG. 3A is a block diagram schematically showing an example of the book file format. In the book file of this example, a book, chapter, and page are represented by corresponding nodes. One book file includes one book. The book and chapter are a concept for defining a book structure, and contain, as entities, defined attribute values and links to lower layers. The page has, as an entity, data of each page output from an application program. In addition to an attribute value, the page contains the entity of an original page (original page data) and a link to each original page data. In some cases, a print page to be output onto a paper medium or the like includes a plurality of original pages. This structure is displayed not by a link but by an attribute in the book, chapter, or page layer.

Figure 3B:
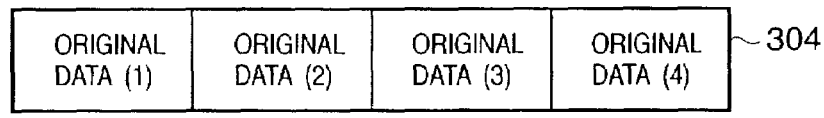

In FIGS. 3A and 3B, a book 301 defines a book attribute, and is linked to two chapters 302A and 302B. These links display that the chapters 302A and 302B are included in the book 301. The chapter 302A is linked to pages 303A and 303B, which represents that the chapter 302A includes these pages. The pages 303A and 303B define attribute values, and contain links to original page data (1) and (2) serving as entities. These links represent data (1) and (2) of original page data 304 shown in FIG. 3B, and display that the entities of the pages 303A and 303B are original page data (1) and (2).

FIGS. 4A and 4B show a list of book attributes. As for an item which can be defined repetitively on a lower layer, the attribute value of the lower layer is preferentially adopted. As for an item contained in only the book attribute, a value defined in the book attribute is effective over the book. An item repetitively defined on a lower layer is a default value used when this item is not defined in the lower layer. Each item shown in FIGS. 4A and 4B do not always correspond to one concrete item, but may contain a plurality of relevant items.

FIG. 5 shows a list of chapter attributes, and FIG. 6 shows a list of page attributes. The relationship between chapter attributes and page attributes is the same as that between book attributes and lower layer attributes.

Items unique to book attributes are six items: printing method, details of bookbinding, front/back cover, index sheet, slip sheet, and chaptering. These items are defined over the book. As printing method attributes, three values: single-sided printing, double-sided printing, and bookbinding printing can be designated. Bookbinding printing is a method of printing data in a format which allows bookbinding by bundling a separately designated number of paper sheets, folding the bundle into two, and binding the bundle. As detailed bookbinding attributes, the opening direction and the number of paper sheets to be bundled can be designated when bookbinding printing is designated.

The front/back cover attribute includes designation of adding paper sheets serving as front and back covers when an electronic original file combined as a book is printed, and designation of contents to be printed on the added paper sheets. The index sheet attribute includes designation of inserting a deckle-edged index sheet separately prepared in a printing apparatus for chaptering, and designation of contents to be printed on the index (deckle-edged) portion. This attribute becomes effective when a printing apparatus to be used is equipped with an inserter having an inserting function of inserting a paper sheet prepared separately from a print paper sheet into a desired position, or when a plurality of sheet cassettes can be used. This also applies to the slip sheet attribute.

The slip sheet attribute includes designation of inserting a paper sheet fed from an inserter or sheet feed cassette for chaptering, and designation of a sheet feed source when a slip sheet is inserted.

The chaptering attribute includes designation of whether to use a new paper sheet, use a new print page, or do nothing particular at a chapter break. In single-sided printing, the use of a new paper sheet and the use of a new print page are the same. In double-sided printing, two consecutive chapters are not printed on one paper sheet if "the use of a new paper sheet" is designated, but may be printed on the upper and lower surfaces of one paper sheet if "the use of a new print page" is designated.

As for the chapter attribute, there is no item unique to the chapter, and all items overlap those of the book attribute. If the definition of the chapter attribute is different from that of the book attribute, a value defined by the chapter attribute precedes. Items common to only the book and chapter attributes are five items: paper size, paper direction, N-up printing designation, enlargement/reduction, and discharge method. The N-up printing designation attribute is an item for designating the number of original pages included in one print page. Layouts which can be designated are 1×1, 1×2, 2×2, 3×3, 4×4, and the like. The discharge method attribute is an item for designating whether to staple discharged paper sheets, and whether to apply Z-fold to discharged paper sheets. The effectiveness of this item depends on whether the printing apparatus has a staple function and a Z-fold function, respectively.

Items unique to the page attribute are a page rotation attribute, zoom, layout designation, annotation, and page division. The page rotation attribute is an item for designating the rotation angle when an original page is laid out on a print page. The zoom attribute is an item for designating the zoom ratio of an original page. The zoom ratio is designated based on a virtual logical page region size=100%. The virtual logical page region is a region occupied by one original page when original pages are laid out in accordance with N-up designation or the like. For example, the virtual logical page region is a region corresponding to one print page for 1×1, and a region obtained by reducing each side of one print page to about 70% for 1×2.

Attributes common to the book, chapter, and page are a watermark attribute and header/footer attribute. The watermark is a separately designated image or character string printed over data created by an application. The header and footer are watermarks printed at the upper and lower margins of each page. For the header and footer, items such as a page number, and time and date which can be designated by variables are prepared. Contents which can be designated by the watermark attribute and header/footer attribute are common to the chapter and page, but are different in the book. The book can set the contents of the watermark and header/footer, and designate how to print a watermark or header/footer throughout the book. To the contrary, the chapter and page can designate whether to print a watermark or header/footer set by the book on the chapter or page.

<Book File Generation Procedures>

Figure 7:
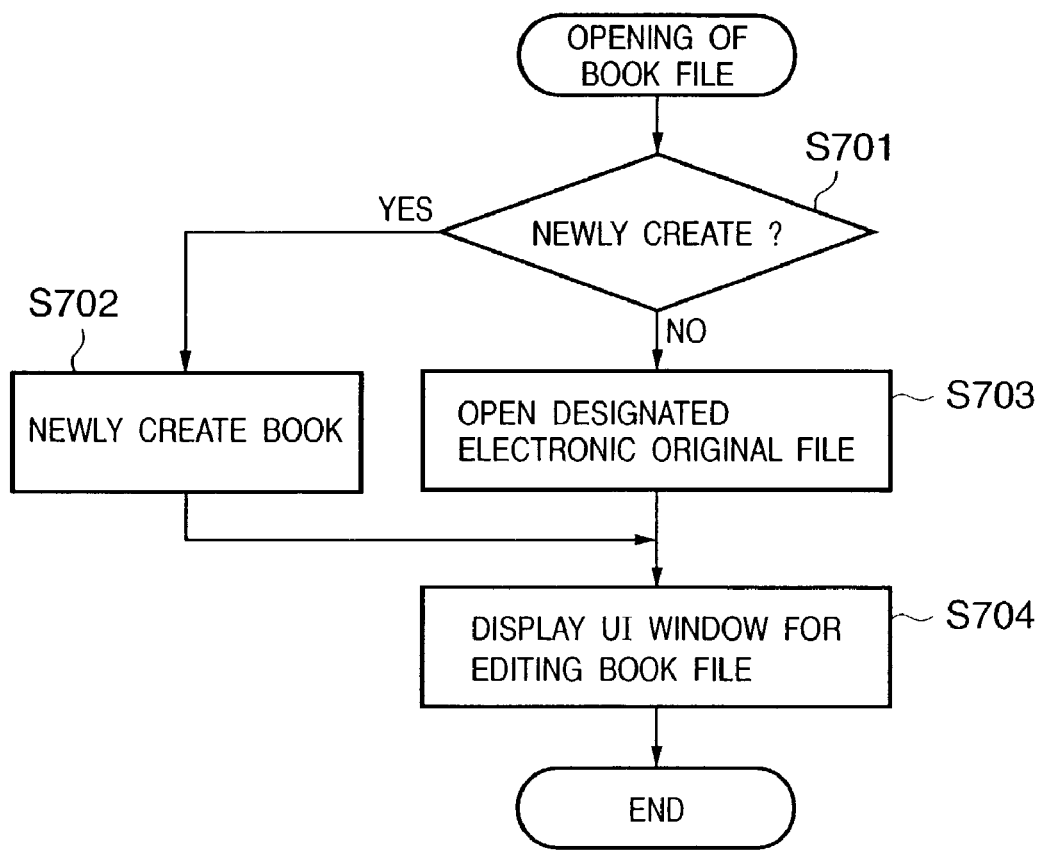
FIG. 7 is a flow chart showing procedures of opening a book file.

The book file has the above-described structure and contents. Procedures of creating a book file by the bookbinding application 104 and electronic original writer 102 will be explained. Creation of a book file is realized as part of book file editing operation by the bookbinding application 104. FIG. 7 shows procedures when the bookbinding application 104 opens a book file.

Figure 11:
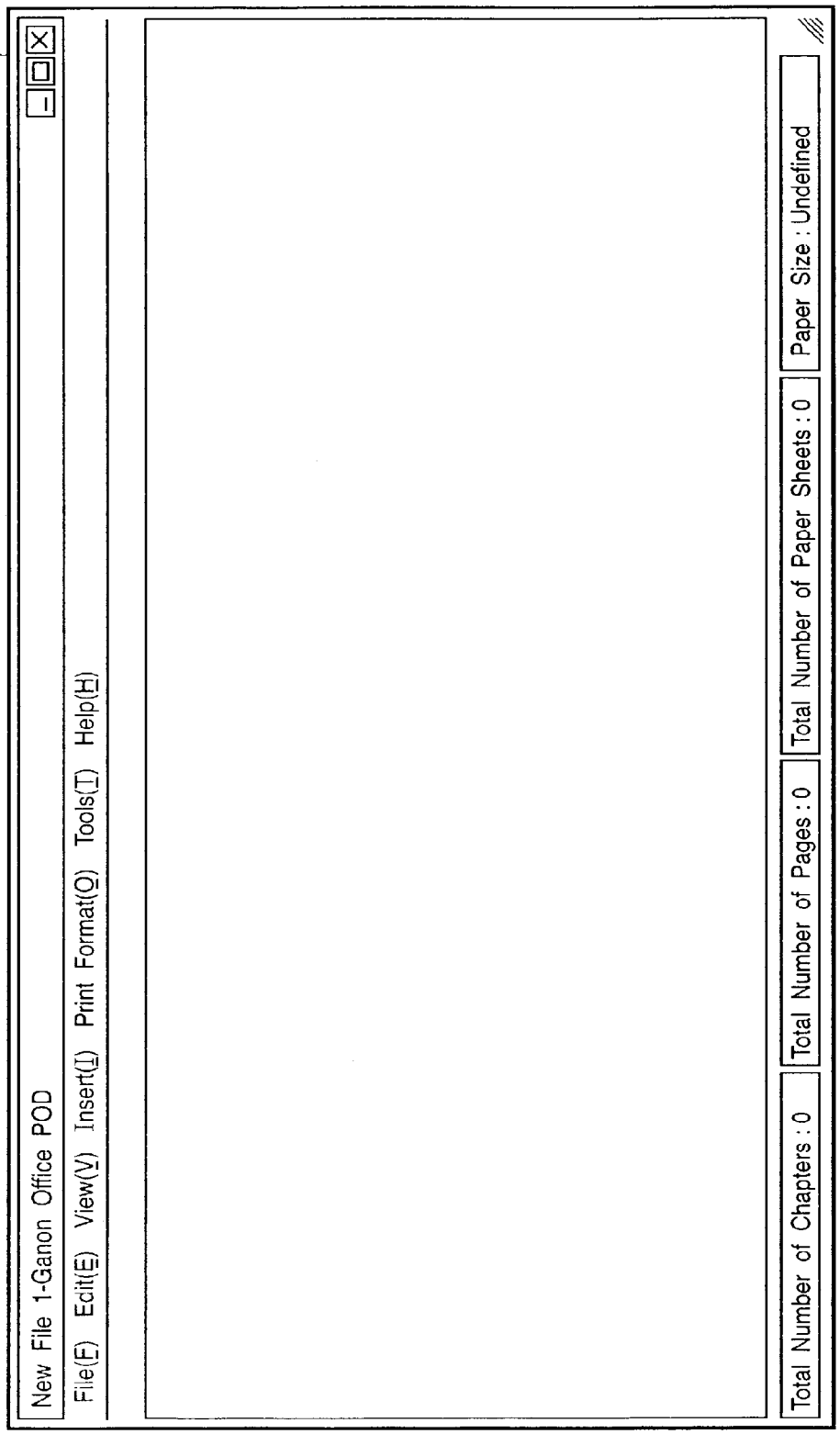
FIG. 11 is a view showing an example of a user interface window when a new book file is opened.

First, the bookbinding application 104 checks whether a book file to be opened is one to be newly created or an existing one (step S701). If YES in step S701, the bookbinding application 104 newly creates a book file including no chapter (step S702). In the example shown in FIGS. 3A and 3B, the newly created book file is a book node which has only the book node 301 without any link to a chapter node. As the book attribute, a set of attributes prepared in advance for creation of a new book file are applied. Then, a UI (User Interface) window for editing the new book file is displayed (step S704). FIG. 11 shows an example of the UI window when a book file is newly created. In this case, a UI window 1100 does not display any information because the book file does not have any substantial content.

Figure 10:
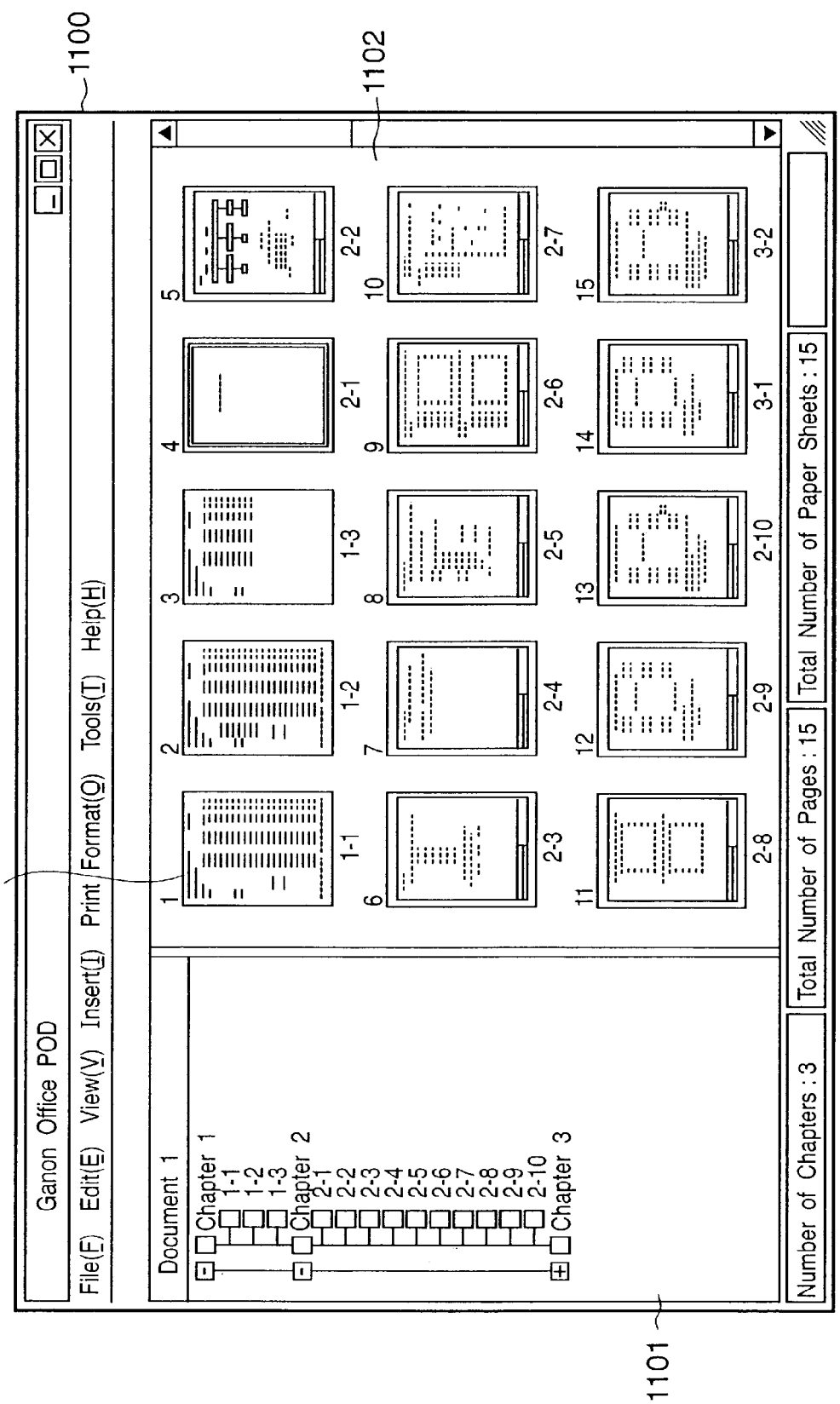
FIG. 10 is a view showing an example of a user interface window when an existing book file is opened.

If NO in step S701, the bookbinding application 104 opens a designated book file (step S703), and a UI (User Interface) window is displayed in accordance with the structure, attribute, and contents of the book file. FIG. 10 shows an example of the UI window. The UI window 1100 has a tree portion 1101 representing a book structure, and a preview portion 1102 displaying a state to be printed. The tree portion 1101 displays chapters included in the book and pages included in each chapter by a tree structure as shown in FIG. 3A. Pages displayed at the tree portion 1101 are original pages. The preview portion 1102 displays reduced print page contents. The display order reflects the book structure.

Figure 8:
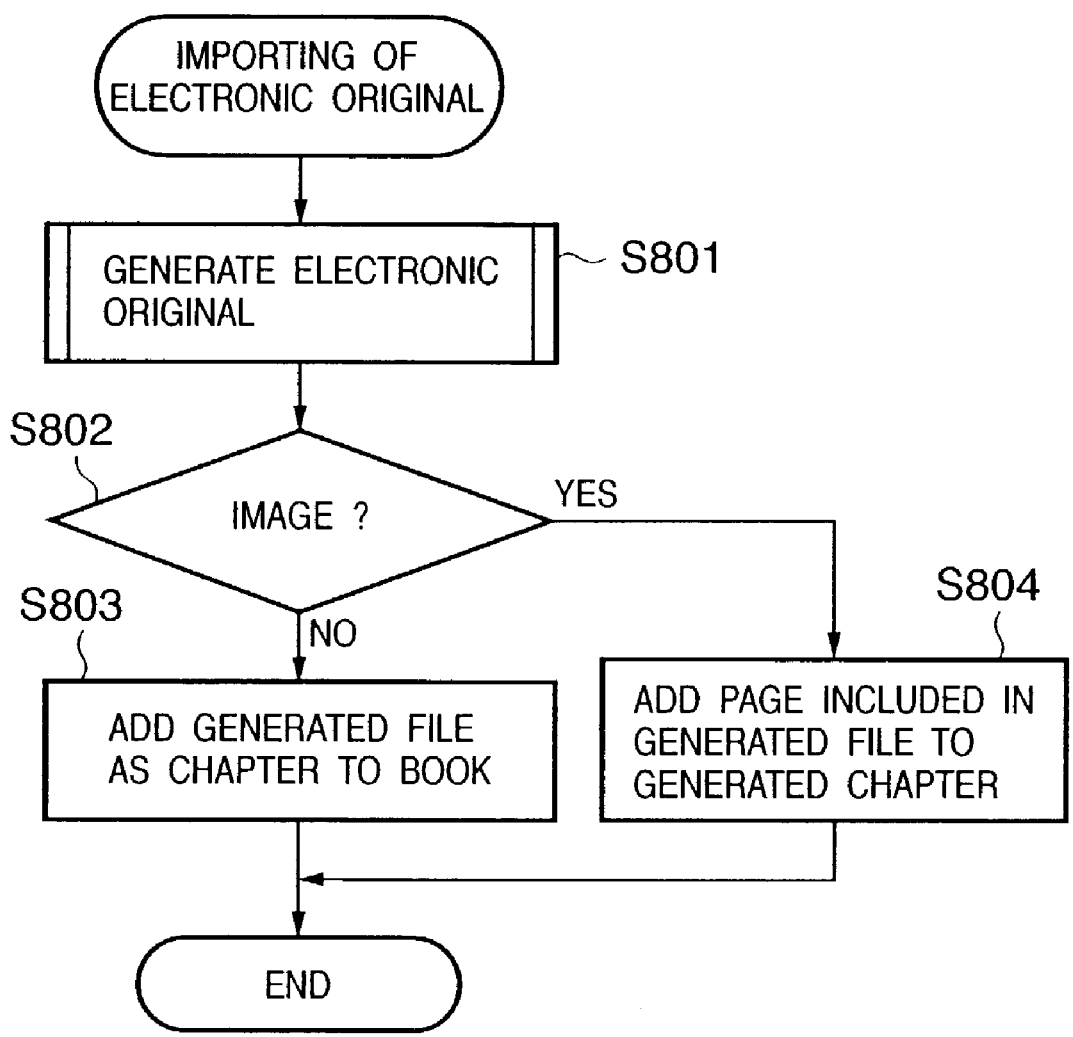
FIG. 8 is a flow chart showing procedures of importing an electronic original file into a book file.

Application data converted into an electronic original file by the electronic original writer 102 can be added as a new chapter to the opened book file. This function is called an electronic original import function. An electronic original is imported to the book file newly created by the procedures of FIG. 7, thereby giving an entity to the book file. This function is activated by drag-and-drop operation of application data to the window of FIG. 10 or 11. FIG. 8 shows electronic original import procedures.

First, the bookbinding application 104 activates an application program which has generated designated application data. The electronic original writer 102 is designated as a device driver, and prints out application data to convert it into electronic original data (step S801). After conversion, whether the converted data is image data is checked (step S802). This determination can be achieved based on the file extension of the application under the Windows OS. For example, an extension "bmp" represents Windows bitmap data; "jpg", jpeg-compressed image data; and "tiff", tiff-format image data. If YES in step S802, processing in step S801 can be skipped because an electronic original file can be directly generated from image data without activating an application in step S801.

If NO in step S802, the bookbinding application 104 adds the electronic original file generated in step S801 as a new chapter to the book of a currently open book file (step S803). As for the chapter attribute, an attribute common to a book attribute is set to a book attribute value, and a different attribute is set to a default value prepared in advance.

If YES in step S802, no new chapter is added in principle, and each original page included in the electronic original file generated in step S801 is added to a designated chapter (step S804). For a file in which a book file is newly created, a new chapter is created, and each page of the electronic original file is added as a page belonging to the chapter. As for the page attribute, an attribute common to an upper layer attribute is given the attribute value of the upper layer attribute, and an attribute which is defined in application data and inherited to the electronic original file is given a value defined in the application data. For example, when N-up designation is defined in application data, the page inherits this attribute value. In this way, a new book file is created, or a new chapter is added.

Figure 9:
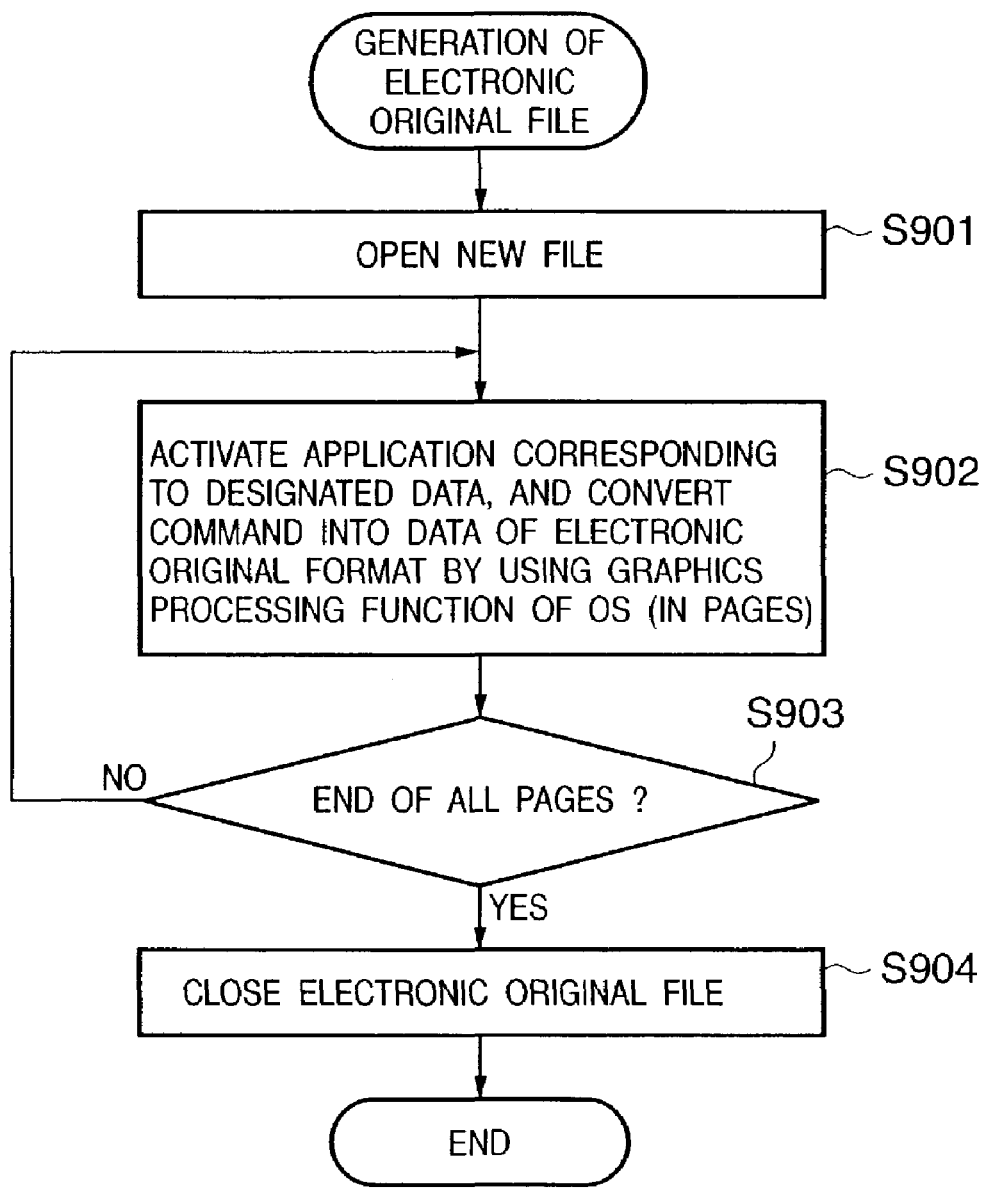
FIG. 9 is a flow chart showing procedures of converting application data into an electronic original file.

FIG. 9 is a flow chart showing procedures of generating an electronic original file by the electronic original writer 102 in step S801 of FIG. 8. A new electronic original file is created and opened (step S901). An application corresponding to designated application data is activated. The electronic original writer is set as a device driver to transmit an output command to the output module of the OS. The output module converts the received output command into data of the electronic original format by the electronic original writer 102, and outputs the converted data (step S902). The output destination is the electronic original file opened in step S901. The electronic original writer 102 checks whether all designated data have been converted (step S903), and if YES in step S903, the electronic original file is closed (step S904). The electronic original file generated by the electronic original writer 102 is a file containing original page data entities shown in FIG. 3B.

<Editing of Book File>

As described above, a book file can be created from application data. The generated book file allows editing a chapter and page as follows.
(1) New document
(2) Delete
(3) Copy
(4) Cut
(5) Paste
(6) Move
(7) Change chapter name
(8) Reassign page number/name
(9) Insert cover
(10) Insert slip sheet
(11) Insert index sheet
(12) Page layout of each original page In addition, an operation of canceling executed editing operation, and an operation of restoring canceled operation can be performed. These editing functions enable editing operations such as consolidation of a plurality of book files, rearrangement of chapters and pages within a book file, delete of chapters and pages within a book file, layout change of an original page, and insertion of a slip sheet and index sheet. By these operations, operation results are reflected on attributes shown in FIGS. 4A to 6 and on a book file structure. For example, a blank page is inserted into a designated portion by an operation of newly adding a blank page. The blank page is processed as an original page. If the layout of an original page is changed, the change contents are reflected on attributes such as the printing method, N-up printing, front/back cover, index sheet, slip sheet, and chaptering.

<Output of Book File>

The ultimate goal of a book file created and edited in the above manner is to print it out. The user selects a file menu from the UI window 1100 of the bookbinding application 104 shown in FIG. 10, and selects "print" from this menu. Then, the book file is printed out from a designated output device. At this time, the bookbinding application 104 creates a job ticket from a currently open book file, and transfers the job ticket to the electronic original despooler 105. The electronic original despooler 105 converts the job ticket into an OS output command, e.g., a Windows GDI command, and transmits the command to an output module, e.g., GDI. The output module generates a command complying with a device by a designated printer driver 106, and transmits the command to the device.

The job ticket is data with a structure whose minimum unit is an original page. The structure of the job ticket defines the layout of an original page on paper. One job ticket is issued for one job. A document node is set at the top of the structure, and defines the attribute of the whole document such as double-sided printing/single-sided printing. A paper node belongs to the document node, and contains attributes such as the identifier of paper for use and designation of a feed port in the printer. A node for a sheet printed by the paper belongs to each paper node. One sheet corresponds to one paper sheet. A print page (physical page) belongs to each sheet. One physical page belongs to one sheet for single-sided printing, and two physical pages belong to one sheet for double-sided printing. An original page to be laid out on a physical page belongs to the physical page. The physical page attribute contains an original page layout.

The electronic original despooler 105 converts the job ticket into an output command to the output module.

<Another System Configuration>

The document processing system of this embodiment has generally been described. This system is of stand-alone type. A server-client system as an extension of the stand-alone system also creates and edits a book file by almost the same arrangement and procedures. A book file and print processing are managed by the server.

Figure 12:
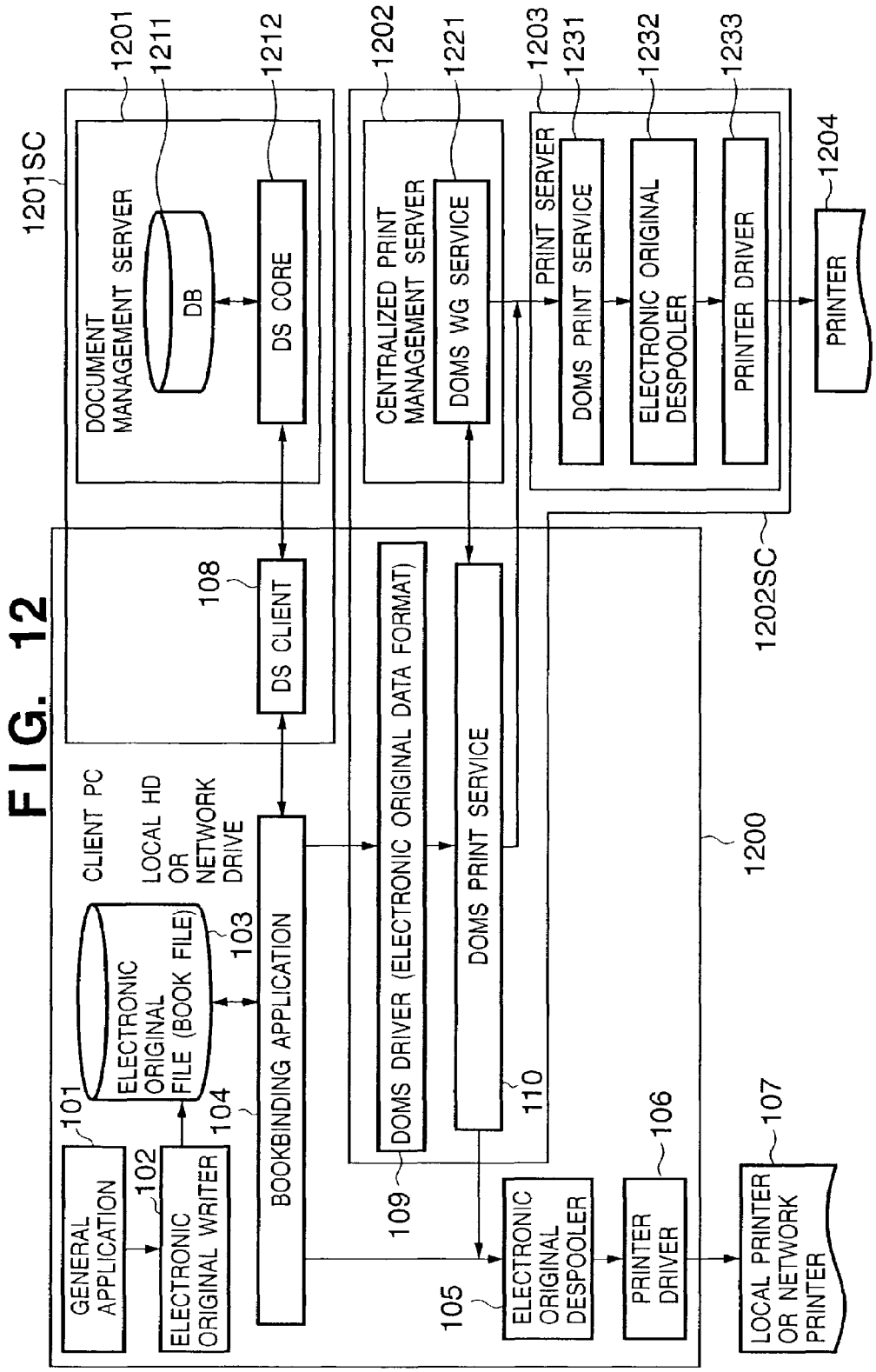
FIG. 12 is a block diagram showing a client-server document processing system.

FIG. 12 is a block diagram showing the arrangement of a server-client document processing system. The client document processing system is constituted by adding to the stand-alone system a DOMS (Document Output Management Service) driver 109 serving as a client module, a DOMS print service module 110, and a DS (Document Service) client module 108. A client document processing system 1200 is connected to a document management server 1201, centralized print management server 1202, and print server 1203. These servers are generally connected to the client document processing system via a network. When the servers also function as clients, they are connected by interprocess communication which simulates communication between networks. The document management server 1201 and centralized print management server 1202 are connected to the client in FIG. 12, but only either one may exist on the network. If the connected server is the document management server, a document management server-client system 1201SC including a client module is added to the stand-alone document management system. If the connected server is the centralized print management server 1202, a print management server-client system 1202SC including a client module is added.

The document management server 1201 stores a book file created and edited by the bookbinding application 104. To manage a book file by the document management server 1201, the book file is saved in a database 1211 of the document management server 1201 instead of or in addition to the local HD of a client PC. Save and read of a book file between the bookbinding application 104 and the document management server 1201 are done via the DS client module 108 and a DS core 1212.

The centralized print management server 1202 manages printing of a book file stored in the client document processing system 1200 or document management server 1201. A print request from the client is transmitted to a DOMS WG server module 1221 of the centralized print management server 1202 via the DOMS driver 109 and DOMS print service module 110. To print a book file by the printer of the client, the centralized print management server 1202 transfers electronic original data to the electronic original despooler 105 via the DOMS print service module 110 of the client. To print a book file by the print server 1203, the centralized print management server 1202 transmits electronic original data to a DOMS print service module 1231 of the print server 1203. For example, the centralized print management server 1202 executes security check on the qualification of a user who has issued a print request for a saved book file, and saves the print processing log. In this fashion, the document processing system can be implemented as both a stand-alone system and client-server system.

<Contents of Preview Display>

As described above, when the bookbinding application 104 opens a book file, the user interface window 1100 shown in FIG. 10 is displayed. The tree portion 1101 displays a tree representing the structure of the opened book (to be referred to as a "book of interest" hereinafter). At the preview portion, three display methods are prepared in accordance with designation by the user. The first display method is an original view mode in which an original page is directly displayed. In the original view mode, the contents of an original page belonging to the book of interest are reduced and displayed. The display at the preview portion does not reflect the layout. The second display method is a print view mode. In the print view mode, the preview portion 1102 displays an original page which reflects the layout of the original page. The third display method is a simple print view mode. In the simple print view mode, the display at the preview portion reflects not the contents of each original page but only the layout.

Sheet feed setting processing in printing processing according to this embodiment will be described next.

FIGS. 13 to 26 respectively show the UI windows for setting, on a single window, of insertion/non-insertion of "front/back cover", "slip sheet/sheets", and "index sheet/sheets". FIGS. 13 to 24 show the cases of single-sided printing and double-sided printing, and FIGS. 25 and 26 show the cases of bookbinding printing. These UI windows are provided by a bookbinding application which outputs GUT information of the UI window to the output module of the OS and controls the output module to display the GUT information on the display window via the display driver (not shown).

Figure 13:
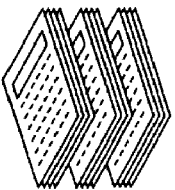
FIG. 13 is a view showing a setting window when none is inserted in single-sided printing and double-sided printing in the embodiment of the present invention.

FIG. 13 shows a UI window for the print settings of the bookbinding application, in which only general pages are set, no special pages are inserted, and no particular items which are to be set are present. If a combo box 1301 of a "pattern" is operated, one pattern can be selected from eleven patterns shown in FIGS. 14 to 24 which are used for setting combinations of insertion paper sheets.

Figure 14:
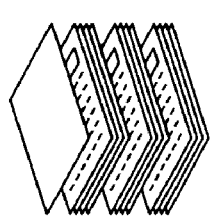
FIG. 14 is a view showing a setting window when only a "front cover" is inserted in single-sided printing and double-sided printing in the embodiment of the present invention.

FIG. 14 shows a UI window for the print settings of the bookbinding application, in which the insertion of a "front cover" is selected, and the insertion from the inserter or sheet feed unit can be selected. If the inserter is selected, a paper sheet prepared in advance is externally fed to make a front cover (in this case, no printing is performed on the front cover). If the paper sheet is inserted from the sheet feed unit, the first page of the print original is printed as the front cover.

Figure 15:
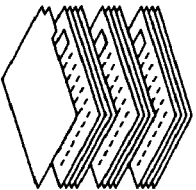
FIG. 15 is a view showing a setting window when only "index sheet/sheets" is/are inserted in single-sided printing and double-sided printing in the embodiment of the present invention.

FIG. 15 shows a UI window for the print settings of the bookbinding application, in which the insertion of an "index sheet/sheets" is selected, and the type numbers of index sheets used and characters to be printed in an index portion can be set.

Figure 16:
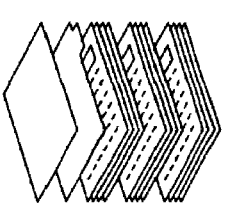
FIG. 16 is a view showing a setting window when the "front cover" and "index sheet/sheets" are inserted in single-sided printing and double-sided printing in the embodiment of the present invention.

FIG. 16 shows a UI window for the print settings of the bookbinding application, in which the insertion of the "front cover" and "index sheet/sheets" is selected. In this case, if the front cover is fed from the sheet feed unit, the "index sheet" which is to be normally inserted in only the front of the chapter is inconsistently inserted in the front of the "front cover" because original data printed on the front cover is included in the chapter. To prevent this, in this pattern, the front cover is restricted such that only the insertion from the inserter can be selected.

Figure 17:
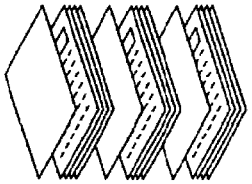
FIG. 17 is a view showing a setting window when only "slip sheet/sheets" is/are inserted in single-sided printing and double-sided printing in the embodiment of the present invention.

FIG. 17 shows a UI window for the print settings of the bookbinding application, in which the insertion of "slip sheet/sheets" is selected. The slip sheet can be inserted in the front of each chapter.

Figure 18:
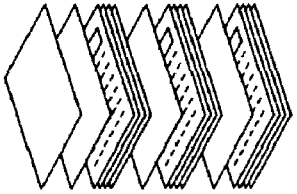
FIG. 18 is a view showing a setting window when the "front cover" and "slip sheet/sheets" are inserted in single-sided printing and double-sided printing in the embodiment of the present invention.

FIG. 18 shows a UI window for the print settings of the bookbinding application, in which the insertion of the "front cover" and "slip sheet/sheets" is selected. Because of the same reason as in the case of FIG. 16, the front cover is restricted such that only the insertion from the inserter can be selected. Similarly, cases in which the "front cover" and the "slip sheet/sheets" or "index sheet/sheets" are combined are similarly restricted.

Figure 19:
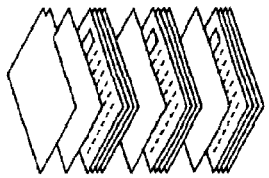
FIG. 19 is a view showing a setting window when the "index sheet/sheets" and "slip sheet/sheets" are inserted in single-sided printing and double-sided printing in the embodiment of the present invention.
Figure 21:
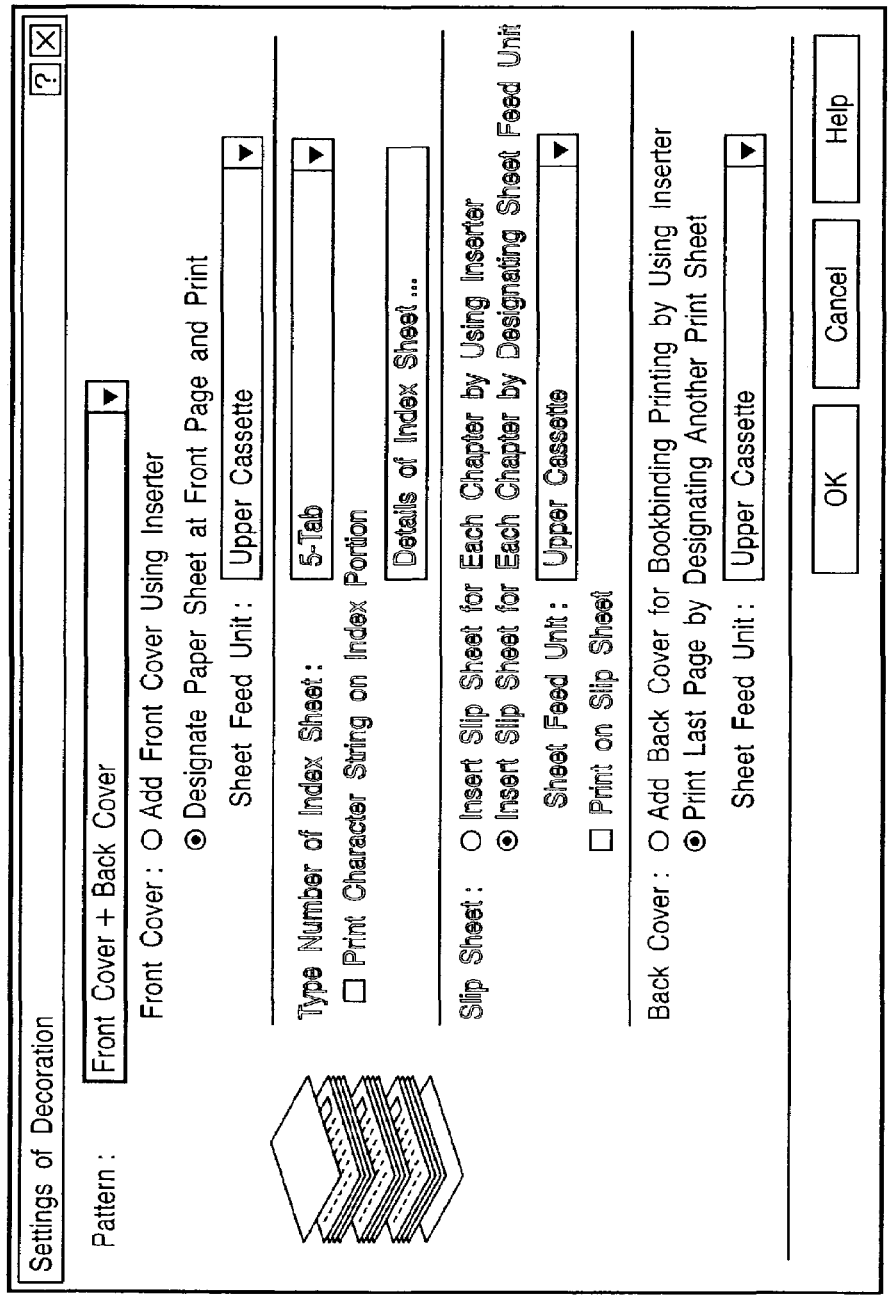
FIG. 21 is a view showing a setting window when the "front cover" and a "back cover" are inserted in single-sided printing and double-sided printing in the embodiment of the present invention.
Figure 22:
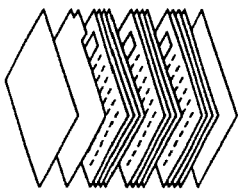
FIG. 22 is a view showing a setting window when the "front cover", "index sheet/sheets", and "back cover" are inserted in single-sided printing and double-sided printing in the embodiment of the present invention.
Figure 24:
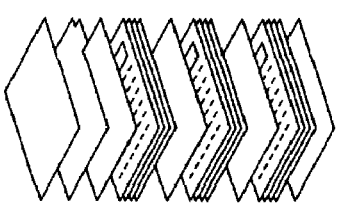
FIG. 24 is a view showing a setting window when the "front cover", "index sheet/sheets", "slip sheet/sheets", and "back cover" are inserted in single-sided printing and double-sided printing in the embodiment of the present invention.

FIG. 19 shows a UI window for the print settings of the bookbinding application, in which the insertion of the "index sheet/sheets" and "slip sheet/sheets" is selected. FIG. 20 shows a UI window for the print settings of the bookbinding application, in which the insertion of the "front cover", "index sheet/sheets", and "slip sheet/sheets" is selected. FIG. 21 shows a UI window for the print settings of the bookbinding application, in which the insertion of the "front cover" and "back cover" is selected. FIG. 22 shows a UI window for the print settings of the bookbinding application, in which the insertion of the "front cover", the "index sheet/sheets", and a "back cover" is selected. FIG. 23 shows a UI window for the print settings of the bookbinding application, in which the insertion of the "front cover", "slip sheet/sheets", and "back cover" is selected. FIG. 24 shows a UI window for the print settings of the bookbinding application, in which the insertion of all the "front cover", "index sheet/sheets", "slip sheet/sheets", and "back cover" is selected.

As described above, the bookbinding application 104 can designate the combination of the insertion paper sheets which are to be inserted in document information, and in accordance with the combination of the insertion sheets designated by the user, the application so controls as to change candidates for the insertion paper sheet feed methods to be selectable by a user. Therefore, the user can easily set the insertion paper sheet feed method with high operability.

FIGS. 25 and 26 respectively show UI windows in bookbinding printing. In this case, since the insertion sheets except for a "cover (and a back cover)" cannot be inserted, the pattern is restricted to be selected from "none" and the "cover (a sheet serving as a front and back cover)", thereby preventing inconsistent settings.

As described above, when the print job is to perform the insertion and/or printing for the specialty sheets such as the "front cover", "index sheet/sheets", "slip sheet/sheets", and "back cover", settings can be easily performed from the single UI window without any inconsistency. This can improve the operation efficiency and eliminate setting errors.

Note that the above settings can be managed, as document information for printing a document which undergoes these settings, together with the file of the document. In this case, document information is simultaneously read out while reading out the corresponding document data and output to the printer driver together with the document data, thereby using the previous settings without any change to print and output the document data.

FIG. 27 is a flow chart showing processing for displaying, on a status bar in the bookbinding application 104, the number of pages to be charged and the number of pages not to be charged.

In step S2701, the bookbinding application 104 acquires page information of a next page. If no page information is acquired in step S2701, it is determined that all the pages are processed (YES in step S2702), the flow shifts to step S2708.

If the page information is acquired (NO in step S2702), the step S2703 and the subsequent processes are executed. Since any paper sheets which are not printed, i.e., any paper sheets fed from the inserter are not to be charged, "the front cover from the inserter" (YES in step S2703), "the slip sheet from the inserter" (YES in step S2704), and "the back cover from the inserter" (YES in step S2705) are not to be charged. Therefore, the flow shifts to step S2706 to increment a counter for a page not to be charged.

If the paper sheet is not fed from the inserter (NO in steps S2703 to S2705), the flow shifts to step S2707 to increment a counter for a page to be charged.

When all the pages are processed, the final values of the counter for a page/pages not to be charged and the counter for a page/pages to be charged are respectively displayed as the number of pages to be charged and the number of pages not to be charged. A place where these values are displayed is not limited to the status bar, and any easy-to-see format may be used.

In this manner, page information is read sequentially from the first page to determine whether each page is to be charged, and each value of the corresponding counter is incremented. With this method, pages to be charged and pages not to be charged are counted and the resultant values are displayed. Since the number of pages to be charged and the number of pages not to be charged are displayed on the status bar, a user can properly know a charged state.

A print layout display in this embodiment will be described next.

Figure 28:
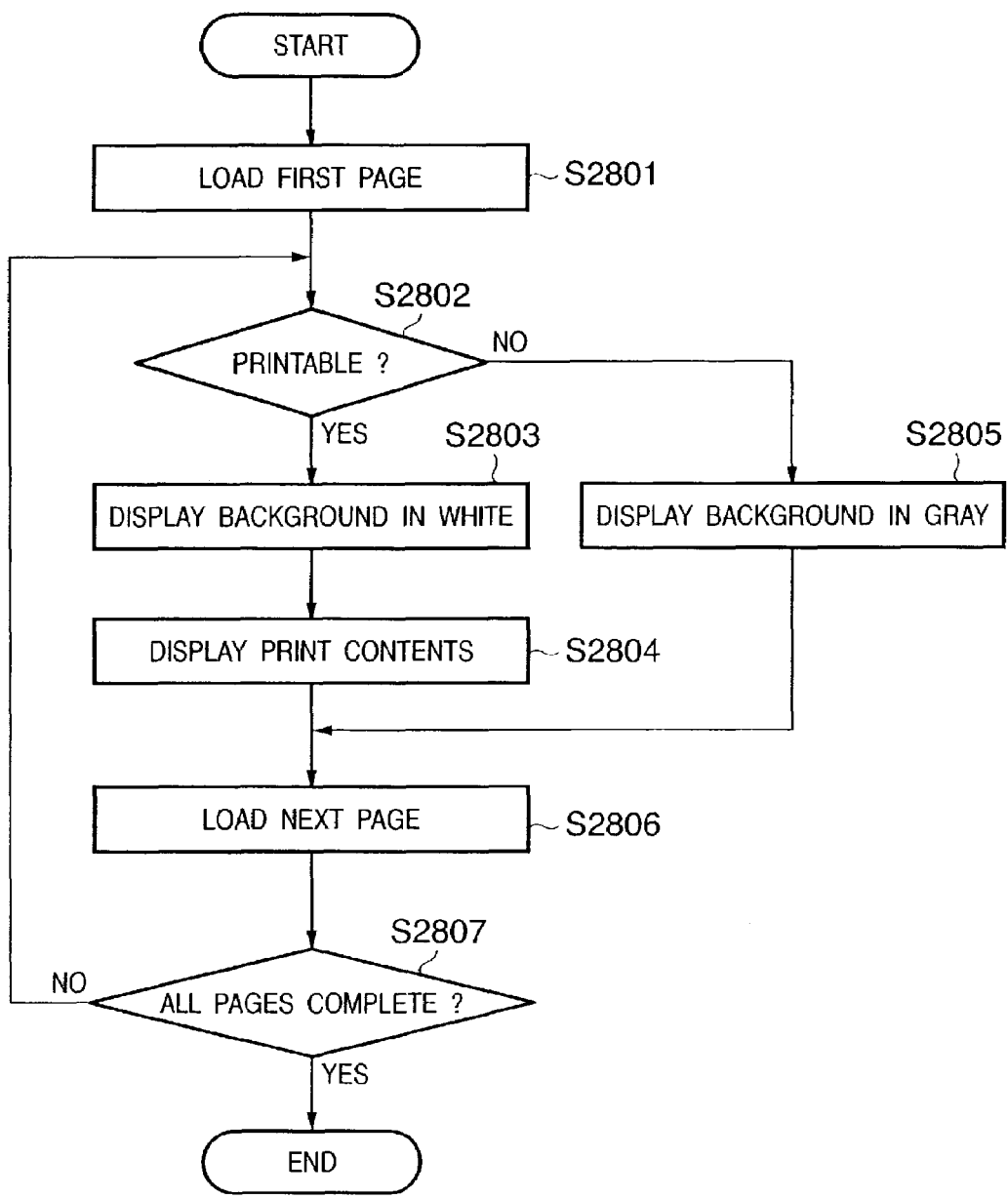
FIG. 28 is a flow chart showing display processing of a print layout in the embodiment of the present invention.

FIG. 28 is a flow chart showing processing for discriminably displaying a printable page and an unprintable page in the print layout display of the bookbinding application 104 according to this embodiment.

First, to display printable or unprintable state, the bookbinding application 104 loads page data sequentially from the first page (step S2801). The bookbinding application 104 determines from the loaded page attribution information whether this page is printable or unprintable (step S2802). If YES in step S2802, the bookbinding application 104 sets white as the background color of the page (step S2803), and draws the page contents thereon (step S2804). If NO in step S2802, the bookbinding application 104 sets gray as the background color of the page (step S2805). After this processing has been sequentially performed for all pages (steps S2806 and S2807), finally, all the printable pages have the white back ground, and all the unprintable pages have the gray background, thereby discriminating printable pages from unprintable pages at a glance.

FIGS. 29A to 29E show display examples when the slip sheet fed from the inserter is inserted. FIG. 29A is a tree portion showing the structure of the documents to be printed. FIG. 29B shows a case in single-sided printing, in which print contents of each page are displayed while the slip sheet is grayed out to enable a user to recognize that it is a special page. FIG. 29C shows an example in double-sided printing. Since the lower surface of the second page is a blank page but the printable page, it is whiten to be clearly discriminated from the unprintable page. The two surfaces of the slip sheet are unprintable. FIGS. 29D and 29E show simple views, in which the print contents shown in FIGS. 29B and 29C are respectively simplified, and are respectively similar to FIGS. 29B and 29C except that the print contents are simplified and displayed.

Figure 30A:
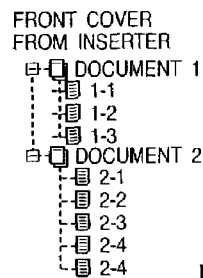
FIGS. 30A to 30G are views showing display examples when a front cover fed from an inserter is added to the front of a document in a print job.
Figure 30B:
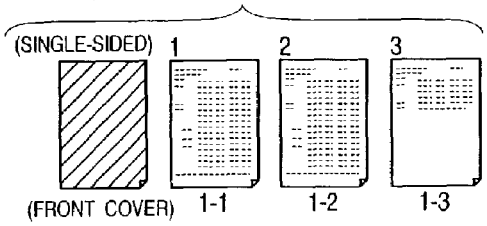
Figure 30C:
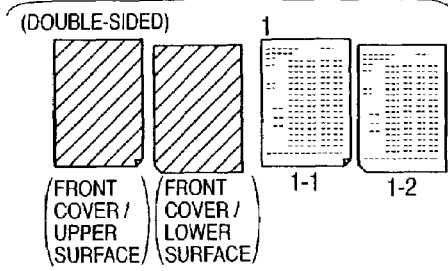
Figure 30D:
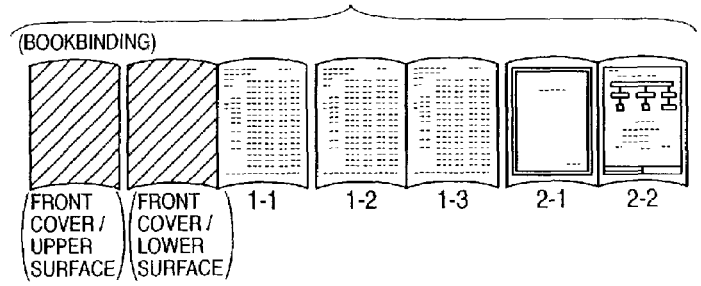
Figure 30E:
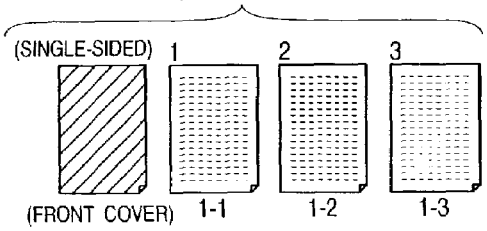
Figure 30F:
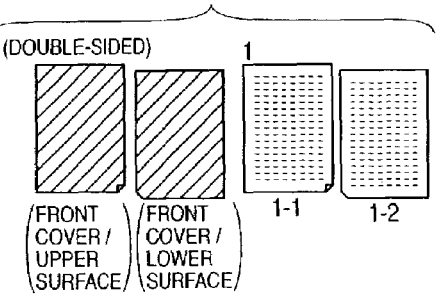
Figure 30G:
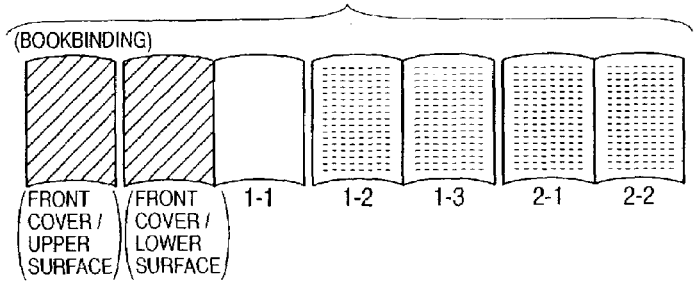

FIGS. 30A to 30G show display examples when the front cover fed from the inserter is added to the front of the documents. FIG. 30A is a tree portion showing the structure of the document to be printed. FIGS. 30B, 30C, and 30D respectively show examples in single-sided printing, double-sided printing, and bookbinding printing, in which the print contents are displayed on the printable pages while the front cover is grayed out to represent that no data is additionally drawn unlike the other pages. FIGS. 30E, 30F, and 30G show simple views representing the simplified print contents, and are respectively similar to FIGS. 30B, 30C, and 30D except that the print contents are simplified and displayed.

FIGS. 31A to 31E show display examples when the index sheets are inserted in the documents. The index sheet has the characteristic feature that its upper surface is printable, but its lower surface is unprintable. For this reason, in the example of single-sided printing shown in FIG. 31B, all the pages including the index sheets are printable. In double-sided printing shown in FIG. 31C, the upper surfaces of the index sheets are whiten to represent that they are printable, but the lower surfaces are grayed out to represent that they are unprintable. FIGS. 31D and 31E show simple views representing the simplified print contents, and are respectively similar to FIGS. 31B and 31C except that the print contents are simplified and displayed.

Figure 32:
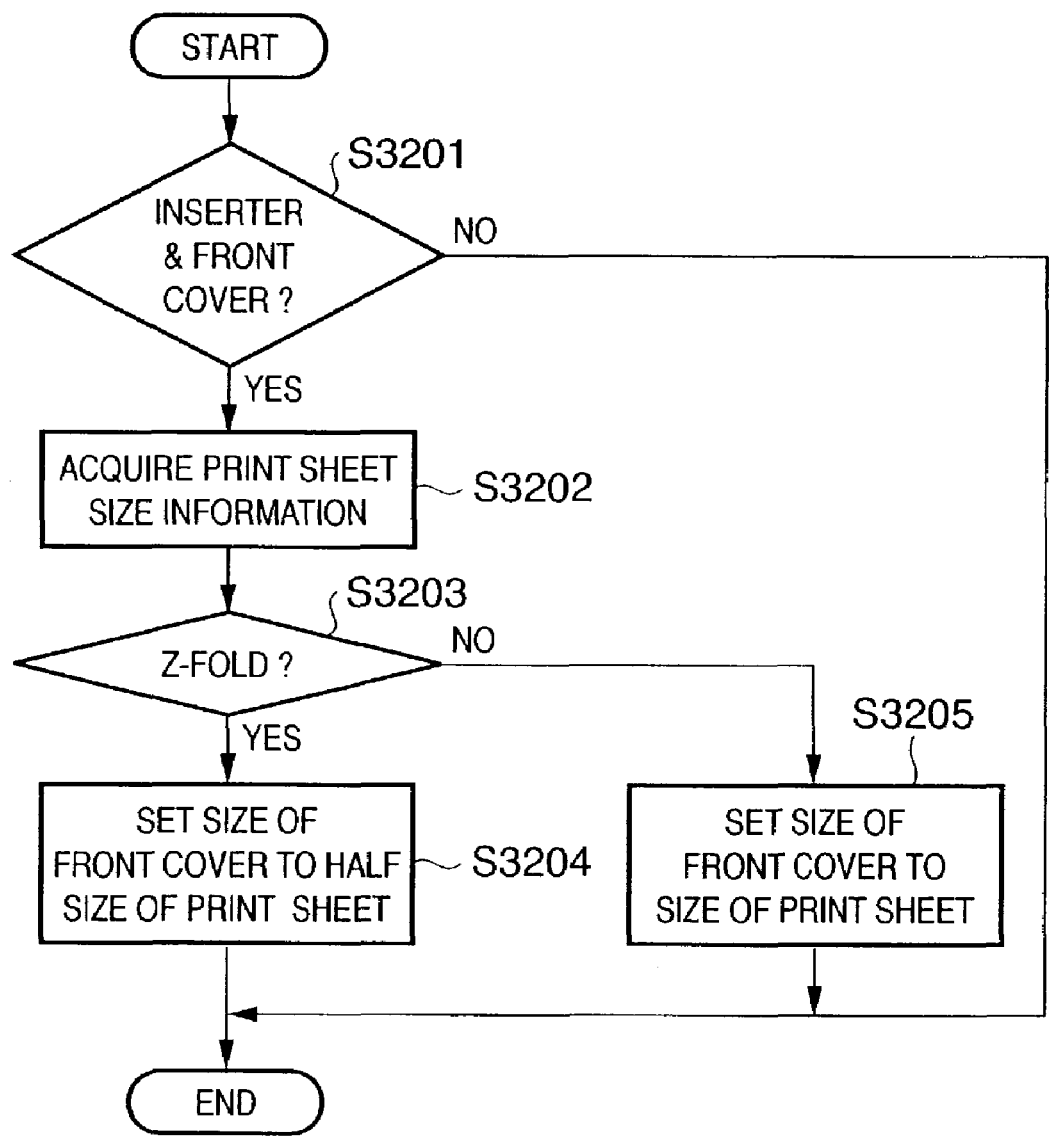
FIG. 32 is a flow chart showing a sheet size determination procedure of a front cover fed from an inserter according to the embodiment of the present invention.

FIG. 32 is a flow chart for determining a sheet size of a front cover when the front cover fed from an inserter is set to be put on the top of document.

First in step S3201, whether or not a front cover fed from an inserter is set to be put is checked, and if YES, then print sheet size information is acquired in step S3202. In step S3203, whether or not "Z-fold" is designated in a discharge method is checked, and if YES, the size of the front cover fed from the inserter is set to a half size of the print sheet. If No in step S3203, then the size of the front cover fed from the inserter is set to the size of the output sheet size.

Figure 33:
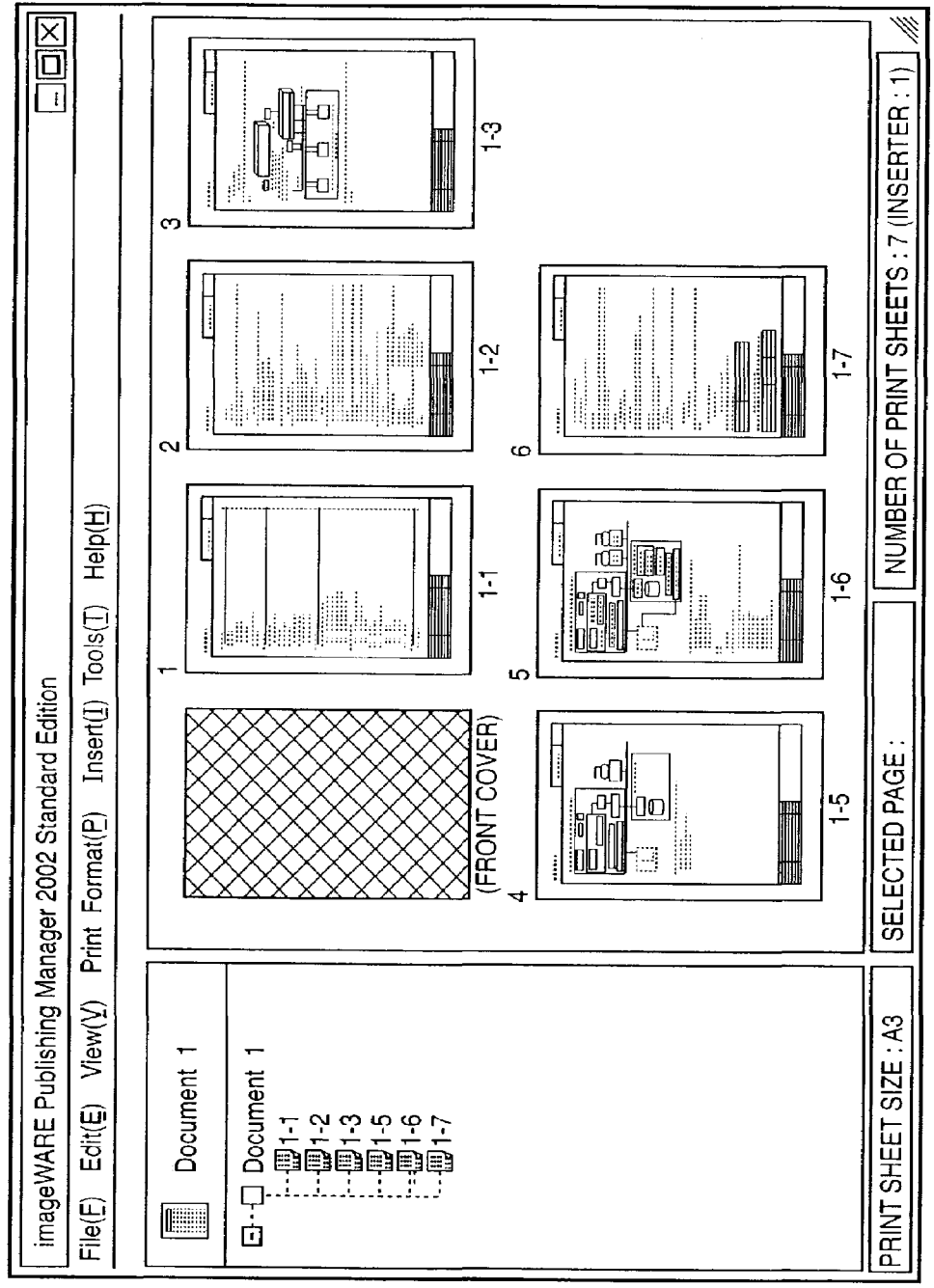
FIG. 33 is a view showing a display window when a front cover fed from an inserter is put on a first page and "Z-fold" is not designated in a print job.

FIG. 33 shows a display example when a front cover is fed from an inserter. The "Z-fold" is not designated in the discharge method, and the size of a cover fed from an inserter is set to the size of other print sheets.

Figure 34:
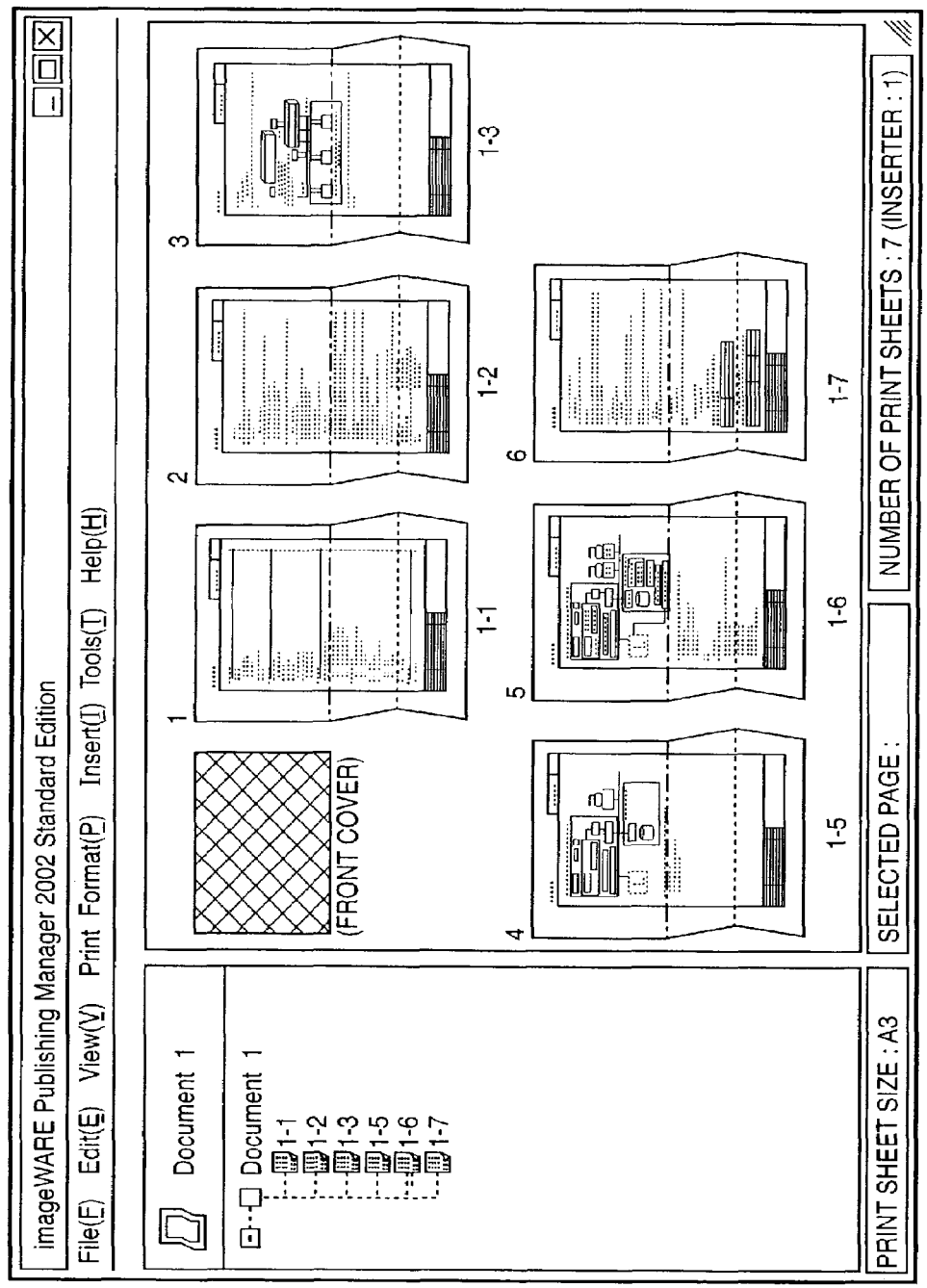
FIG. 34 is a view showing a display window when a front cover fed from an inserter is put on a first page and "Z-fold" is designated in a print job.

FIG. 34 shows a display example when a front cover is fed from an inserter and the "Z-fold" is designated. Other print sheets will be "Z-folded", the size of the front cover fed from the inserter is set to a half of the size of the print sheets.

Further, when the sizes of sheets on which a document is printed are designated "mixed" (e.g., A3 and A4 sizes), the print sheet size information of a larger sheet is acquired in step S3202 in FIG. 32, thereby the size of the front cover fed from the inserter can be set.

Figure 35:
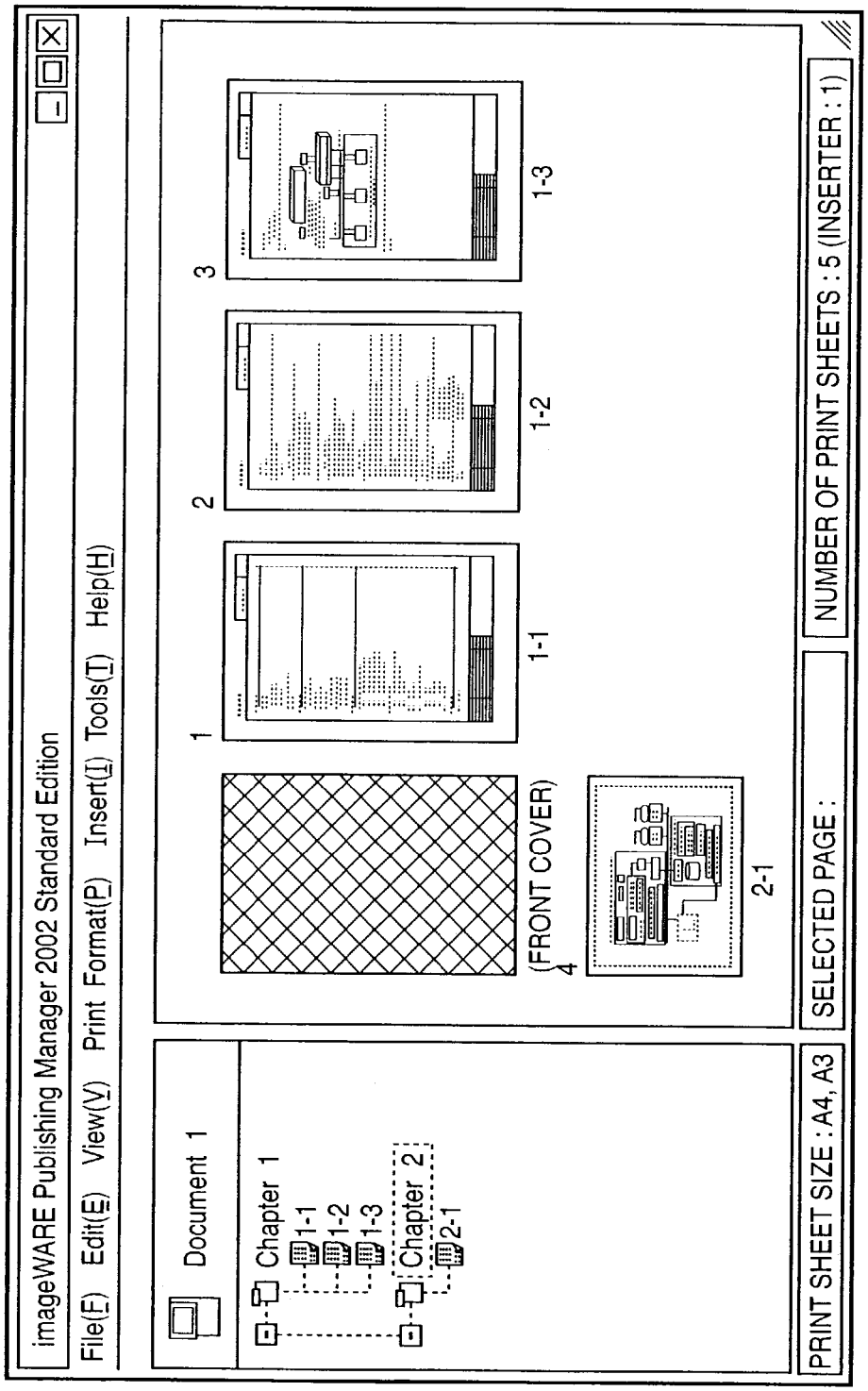
FIG. 35 is a view showing a display window when a front cover fed from an inserter is put on a first page, different types of sheets are set as print sheets, and "Z-fold" is not designated in a print job.

FIG. 35 shows a display example when a front cover is fed from an inserter when mixture of the A3- and A4-size sheets on which a document is printed is designated. "Z-fold" is not designated in the discharge method, and the display shows that the size of the front cover fed from the inserter is set to the size of a larger print sheet.

Figure 36:
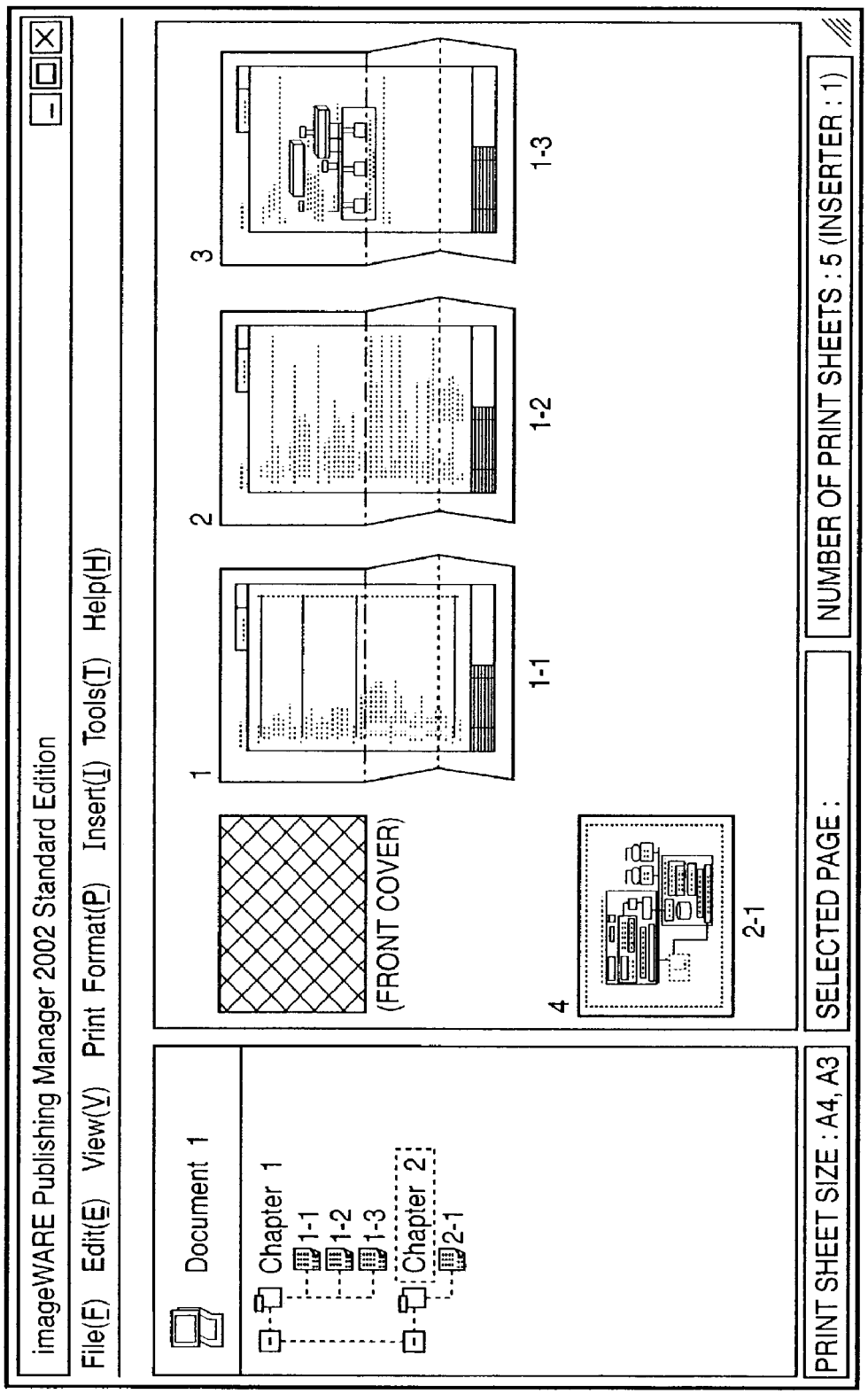
FIG. 36 is a view showing a display window when a front cover fed from an inserter is put on a first page, different types of sheets are set as print sheets, and "Z-fold" is designated in a print job.

FIG. 36 shows a display example when a front cover is fed from an inserter when mixture of the A3- and A4-size sheets on which a document is printed is designated, and "Z-fold" is designated in the discharge method. The display shows that the size of the front cover fed from the inserter is set to the size of a smaller print sheet.

In the FIGS. 32 to 36, a case of inserting a front cover is explained. When inserting index sheet/sheets, slip sheet/sheets, or other speciality sheet/sheets (e.g., a back cover) are inserted from an inserter or the feed port such as the feed cassette which feeds a sheet to the printing mechanism, the similar operation as described above can be applied.

The conventional print layout display does not display the printable and unprintable pages discriminably. However, the printable and unprintable pages are displayed discriminably in this embodiment, so that the user can easily confirm the print setting state.

Further the examples shown in FIGS. 29 to 31 describe the case wherein the slip sheet/sheets, front cover, or index sheet/sheets are inserted. However, the present invention is not limited to this and can discriminably display the printable and unprintable pages by the procedures shown in FIG. 28 even when, for example, another specialty paper (e.g., back cover) is inserted, or the specialty paper is fed from the feed port such as the feed cassette which feeds a paper sheet via the printing mechanism.

The above examples describe the case wherein the background of the printable page is displayed in white and the background of the unprintable page is displayed in gray, but the present invention is not limited to this. The printable and unprintable pages may be displayed in different forms, e.g., in different colors, at different densities, or by adding a bold frame to only the printable page such that the printable and unprintable pages can be discriminated. Various display forms can be considered.

Note that the present invention may be applied to either a system constituted by a plurality of devices, or an apparatus consisting of a single device.

The present invention is not limited to the above embodiments and various changes and modifications can be made within the spirit and scope of the present invention. Therefore to apprise the public of the scope of the present invention, the following claims are made.

What is claimed is:

1. An information processing method of controlling a display of document information to be printed in a printing apparatus, comprising:
　a first setting step of setting insert sheet information related to an insert sheet to be inserted in the print sheets on which the document information was printed;
　a determining step of determining whether each face of the insert sheet is a printable face on which the document information can be printed or an unprintable face on which the document information cannot be printed on the basis of a type of insert sheet specified by the insert sheet information; and
　a controlling step of controlling to display, for each face of the insert sheet, an image of the printable face if the face of the insert sheet is determined in said determining step to be a printable face or an image of the unprintable face if the face of the insert sheet is determined in said determining step to be an unprintable face so that the images of the printable face and the unprintable face are distinguishable from each other before print data based on the document information is transmitted to the printing apparatus
　wherein the sheet feed unit includes a first sheet feed tray which feeds a sheet to a printing mechanism and a second sheet tray which feeds a sheet to a path bypassing the printing mechanism, and
　wherein, when the insert sheet is fed from the second sheet feed tray, both faces of the insert sheet are determined in the determination step to be unprintable, and when a double-sided printing is designated and the insert sheet is an index sheet, the back face of the insert sheet is determined in the determination step to be unprintable.

2. An information processing apparatus for controlling a display of document information to be printed in a printing apparatus, comprising:
- a setting unit adapted to set insert sheet information related to an insert sheet to be inserted in the print sheets on which the document information was printed;
- a determination unit adapted to determine whether each face of the insert sheet is a printable face on which the document information can be printed or an unprintable face on which the document information cannot be printed on the basis of a type of insert sheet specified by the insert sheet information; and
- a display controller adapted to display, for each face of the insert sheet, an image of the printable face if the face of the insert sheet is determined by said determination unit to be a printable face or an image of the unprintable face if the face of the insert sheet is determined by said determination unit to be an unprintable face so that the images of the printable face and the unprintable face are distinguishable from each other before print data based on the document information is transmitted to the printing apparatus wherein the sheet feed unit includes a first sheet feed tray which feeds a sheet to a printing mechanism and a second sheet tray which feeds a sheet to a path bypassing the printing mechanism, and
- wherein, when the insert sheet is fed from the second sheet feed tray, both faces of the insert sheet are determined by the determination unit to be unprintable, and when a double-sided printing is designated and the insert sheet is an index sheet, said determination unit determines that the back face of the insert sheet is unprintable.

* * * * *